US008335353B2

(12) United States Patent
Yamamoto et al.

(10) Patent No.: US 8,335,353 B2
(45) Date of Patent: Dec. 18, 2012

(54) BIOMETRICS AUTHENTICATION SYSTEM

(75) Inventors: Kenji Yamamoto, Kanagawa (JP); Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/450,120

(22) PCT Filed: Apr. 3, 2008

(86) PCT No.: PCT/JP2008/056687
§ 371 (c)(1),
(2), (4) Date: Sep. 11, 2009

(87) PCT Pub. No.: WO2008/123584
PCT Pub. Date: Oct. 16, 2008

(65) Prior Publication Data
US 2010/0092047 A1    Apr. 15, 2010

(30) Foreign Application Priority Data

Apr. 4, 2007  (JP) ................. 2007-098422

(51) Int. Cl.
*G06K 9/00*    (2006.01)
(52) U.S. Cl. ....... 382/115; 382/124; 340/5.53; 340/5.83
(58) Field of Classification Search .......... 382/124, 382/115, 116; 345/82
See application file for complete search history.

(56) References Cited

U.S. PATENT DOCUMENTS

| 4,728,186 A | 3/1988 | Eguchi et al. |
| 5,177,802 A * | 1/1993 | Fujimoto et al. ........... 382/124 |
| 5,745,199 A * | 4/1998 | Suzuki et al. .............. 349/95 |
| 5,986,746 A * | 11/1999 | Metz et al. ............... 356/71 |
| 6,061,463 A | 5/2000 | Metz et al. |

(Continued)

FOREIGN PATENT DOCUMENTS

JP    06-282637    10/1994

(Continued)

OTHER PUBLICATIONS

Supplementary European Search Report issued Jun. 11, 2011 for corresponding 08 73 9794.

(Continued)

*Primary Examiner* — Wesley Tucker
*Assistant Examiner* — Nancy Bitar
(74) *Attorney, Agent, or Firm* — Rader Fishman & Grauer, PLLC

(57) ABSTRACT

A low-profile biometrics authentication system capable of achieving high security level authentication is provided. A biometrics authentication system 1 includes a light source 10, a light guide section 11A, a diffraction section 11B, a microlens array 12, an image pickup device 13, an image processing section 14, a pattern storing section 15, an authentication section 16, a voltage supply section 17, a light source driving section 181, an image pickup device driving section 182 and a control section 19. When light L0 emitted from the light source 10 propagates through the light guide section 11A by total reflection, and then enters the diffraction section 11B, light L1 diffracted at a different angle from an incident angle is generated. Thereby, the light guide section 11A functions as a surface-emitting light source, and total reflection conditions in the light guide section 11A are not satisfied, and the light L1 is guided to the outside of the light guide section 11A, thereby light is sufficiently applied to the inside of the living body 2.

24 Claims, 19 Drawing Sheets

U.S. PATENT DOCUMENTS

| | | | |
|---|---|---|---|
| 6,408,087 B1 * | 6/2002 | Kramer | 382/124 |
| 6,646,289 B1 * | 11/2003 | Badehi | 257/81 |
| 6,850,252 B1 * | 2/2005 | Hoffberg | 715/716 |
| 7,147,153 B2 * | 12/2006 | Rowe et al. | 235/382 |
| 7,366,331 B2 * | 4/2008 | Higuchi | 382/124 |
| 7,550,707 B2 * | 6/2009 | Hashimoto et al. | 250/221 |
| 2004/0062178 A1 * | 4/2004 | Horimai | 369/103 |
| 2004/0252867 A1 * | 12/2004 | Lan et al. | 382/124 |
| 2006/0115129 A1 * | 6/2006 | Abe | 382/115 |
| 2008/0031497 A1 * | 2/2008 | Kishigami et al. | 382/115 |
| 2008/0097143 A1 * | 4/2008 | Califorrniaa | 600/22 |
| 2008/0123908 A1 * | 5/2008 | Waldman et al. | 382/124 |

FOREIGN PATENT DOCUMENTS

| | | | |
|---|---|---|---|
| JP | 2003-043443 | | 2/2003 |
| JP | 2003043443 | * | 2/2003 |
| JP | 2004-086552 | | 3/2004 |
| JP | 2005323892 | * | 5/2004 |
| JP | 2005-323892 | | 11/2005 |
| JP | 2007-526542 | | 9/2007 |
| WO | WO-2005/001753 A1 | | 1/2005 |
| WO | WO-2008/026650 A1 | | 3/2008 |

OTHER PUBLICATIONS

Igaki, Seigo et al., "Holographic Fingerprint Sensor" Fujitsu-Scientific and Technical Journal, vol. 25, No. 4, Dec. 21, 1989, pp. 287-296, XP000103957, Fujitsu Limited, Kawaski, JP ISSN: 0016-2523.

Igaki S. et al., "Real-Time Fingerprint Sensor Using a Hologram" Applied Optics, vol. 31, No. 1110 Apr. 1992, pp. 1794-1802, XP002638274.

Hashimoto, Junichi, "Finger Vein Authentication Technology and Its Future" Symposium on VLSI Circuits Digest of Technical Papers, Dec. 31, 2006, pp. 5-8, XP002638273, ISBN: 1-4244-0006-6.

International Search Report; International Application No. PCT/JP2008/056687; Dated: Jul. 1, 2008.

* cited by examiner

FIG. 6
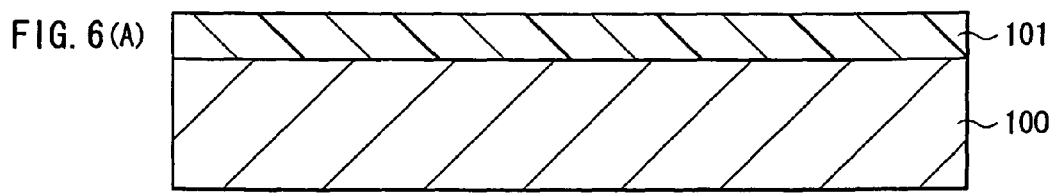
FIG. 6(A)
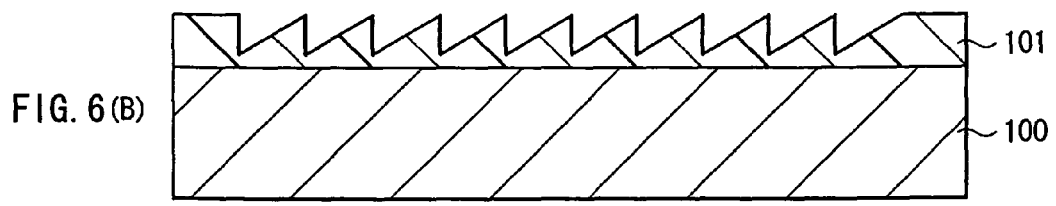
FIG. 6(B)
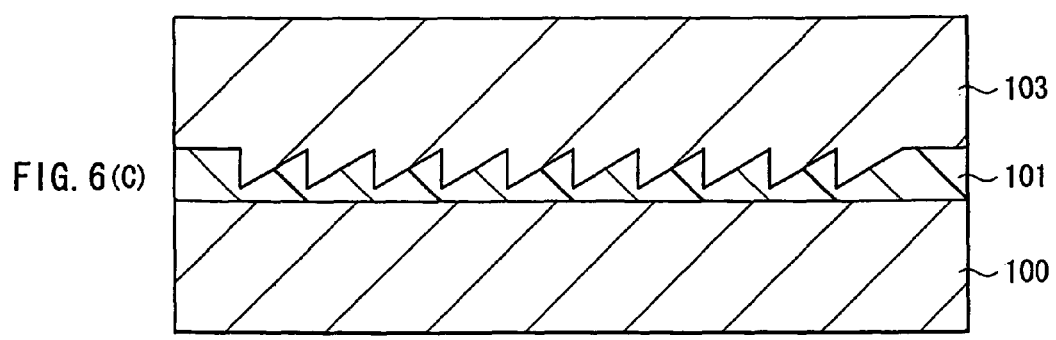
FIG. 6(C)

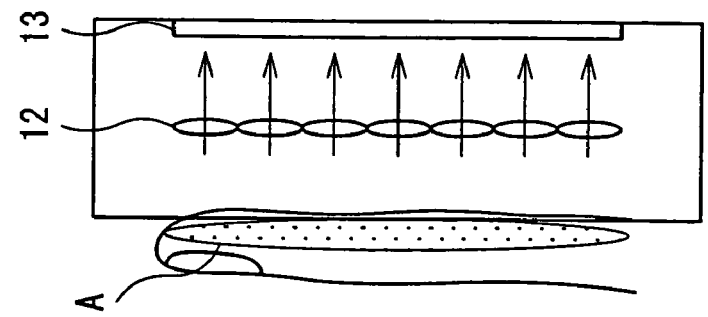
FIG. 16(C)
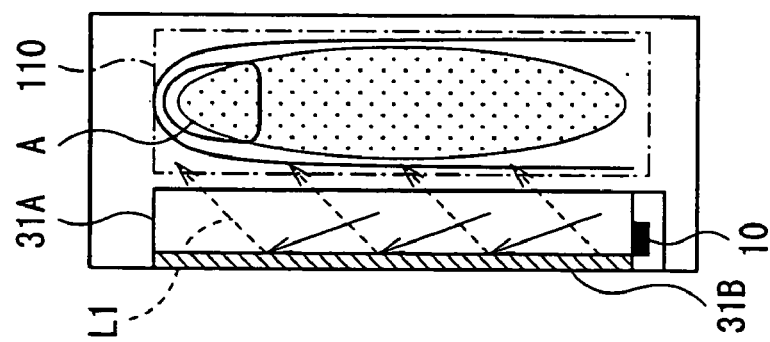
FIG. 16(B)
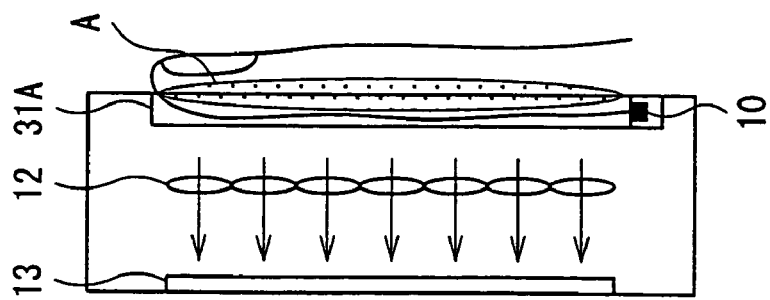
FIG. 16(A)
FIG. 16

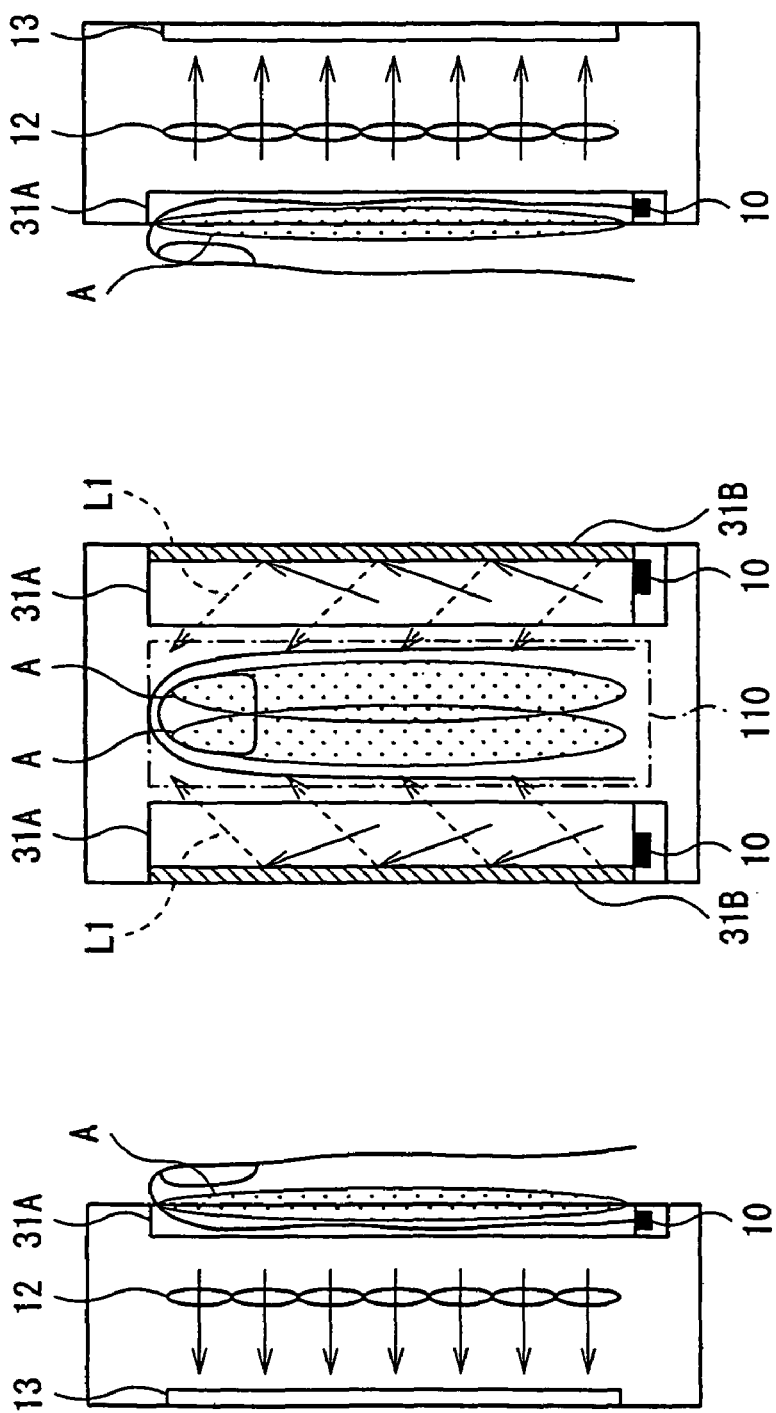

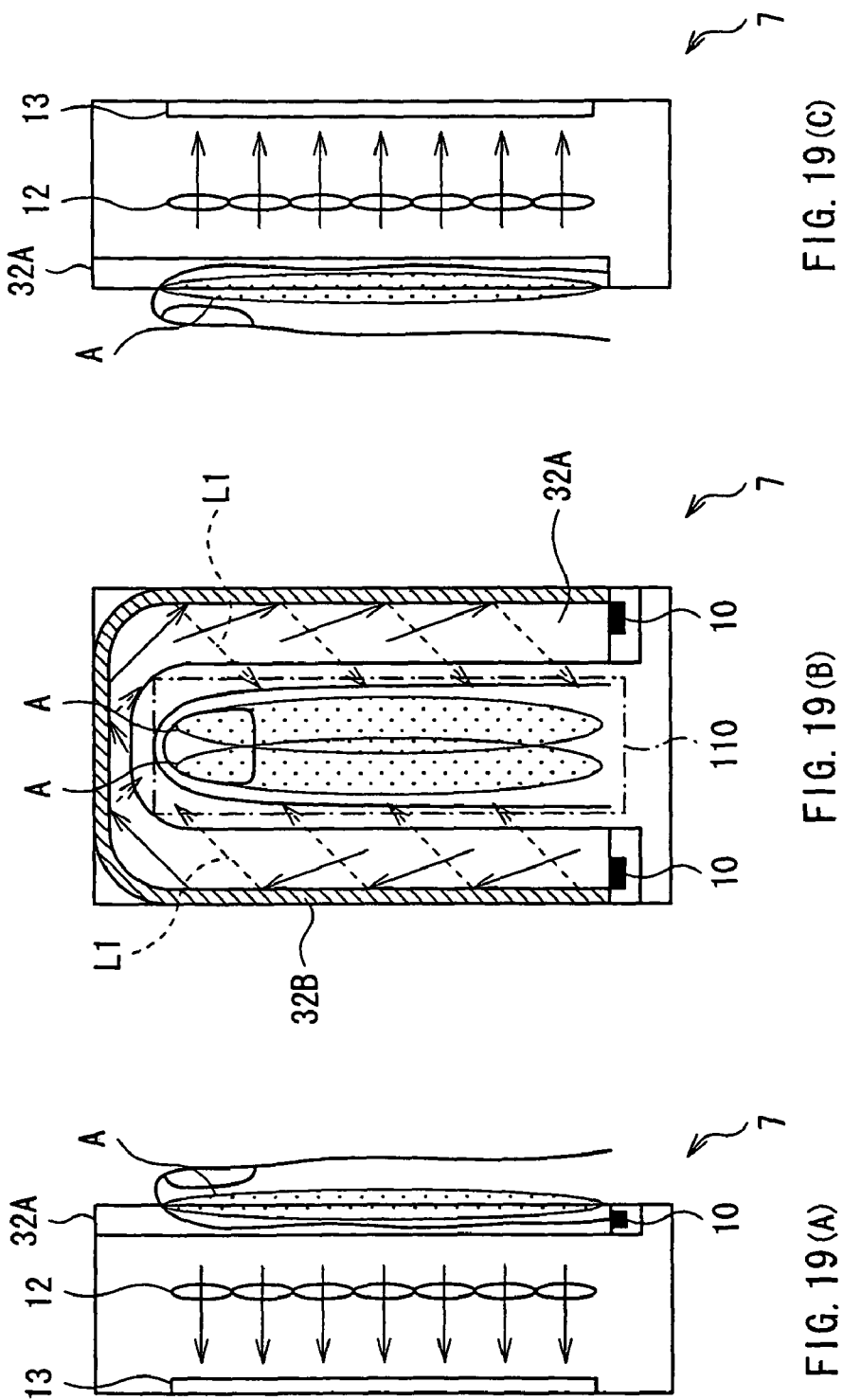

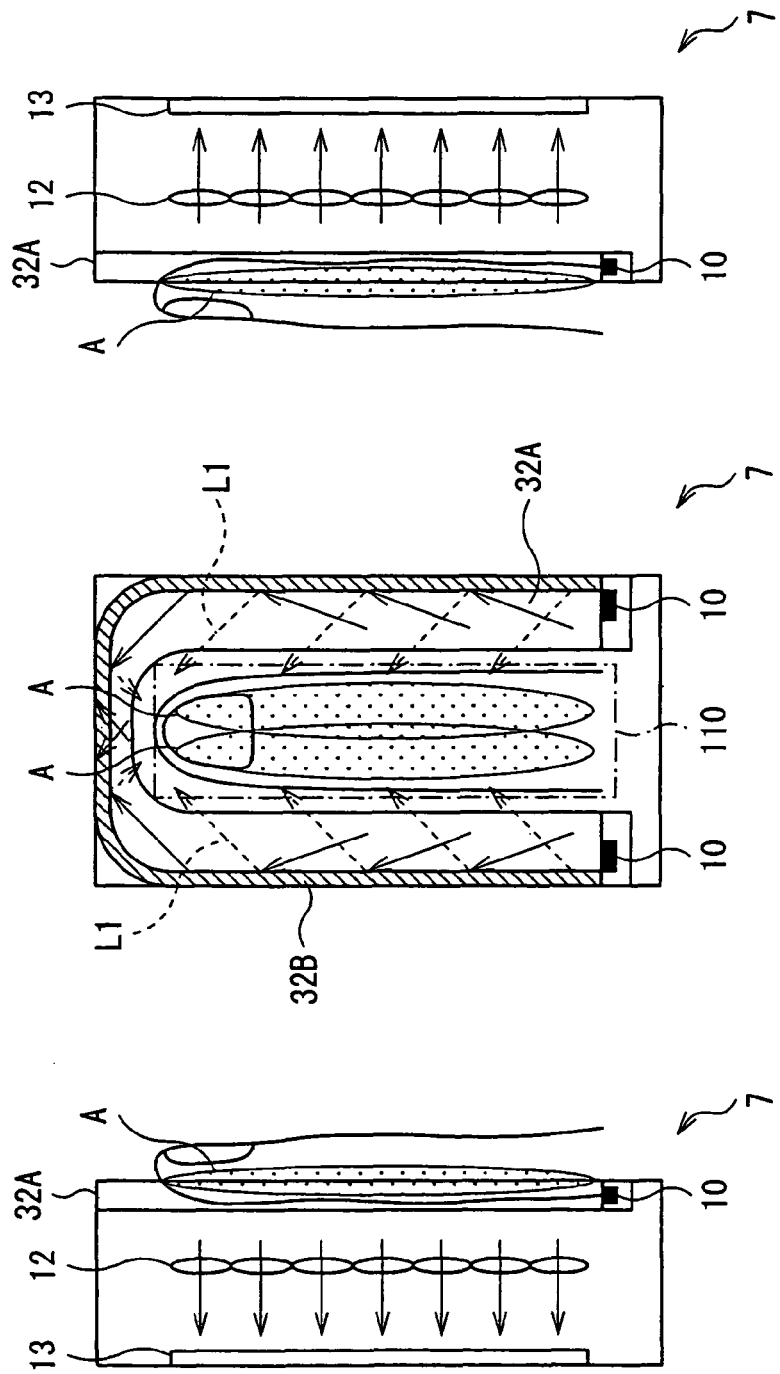

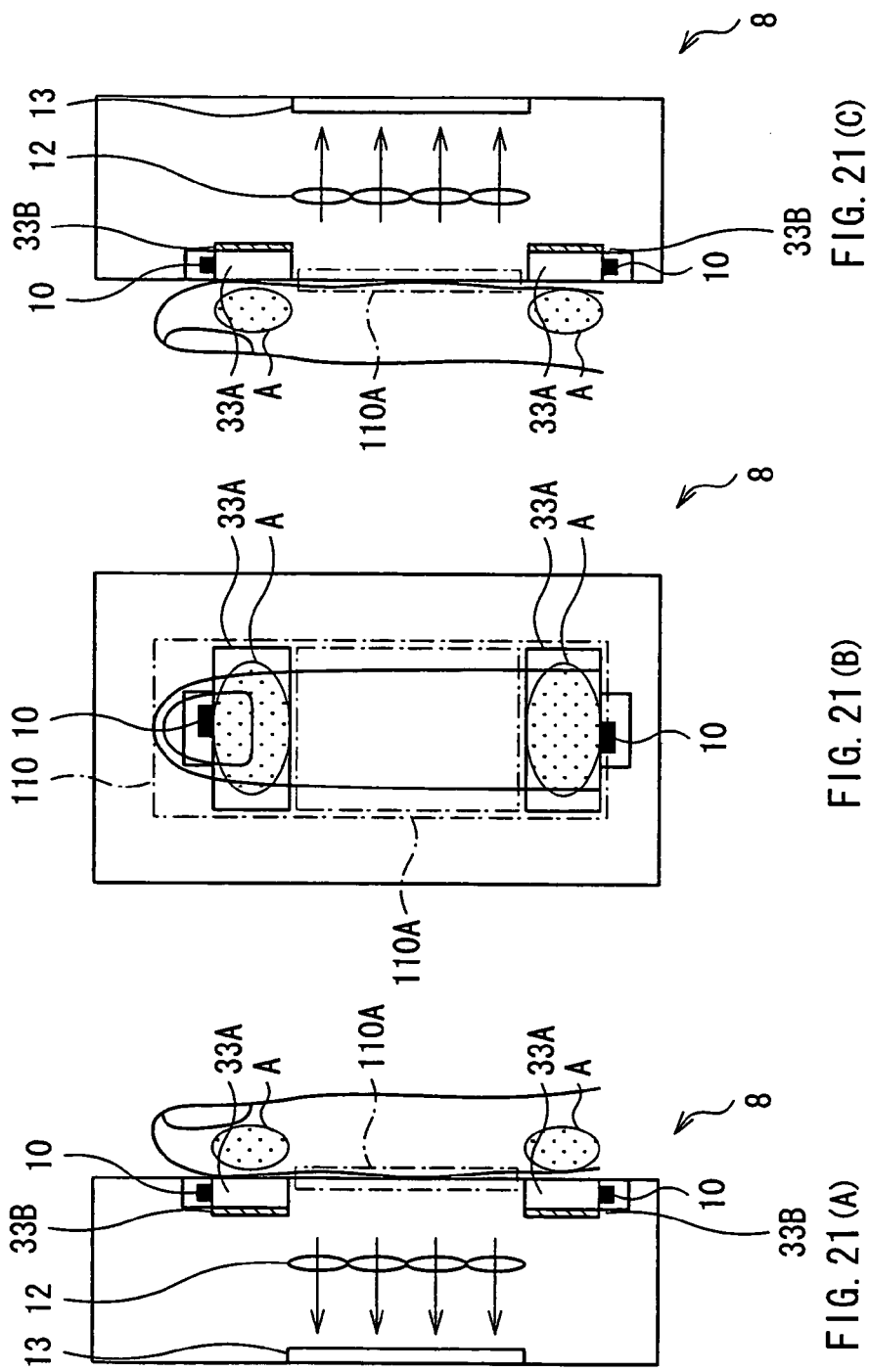

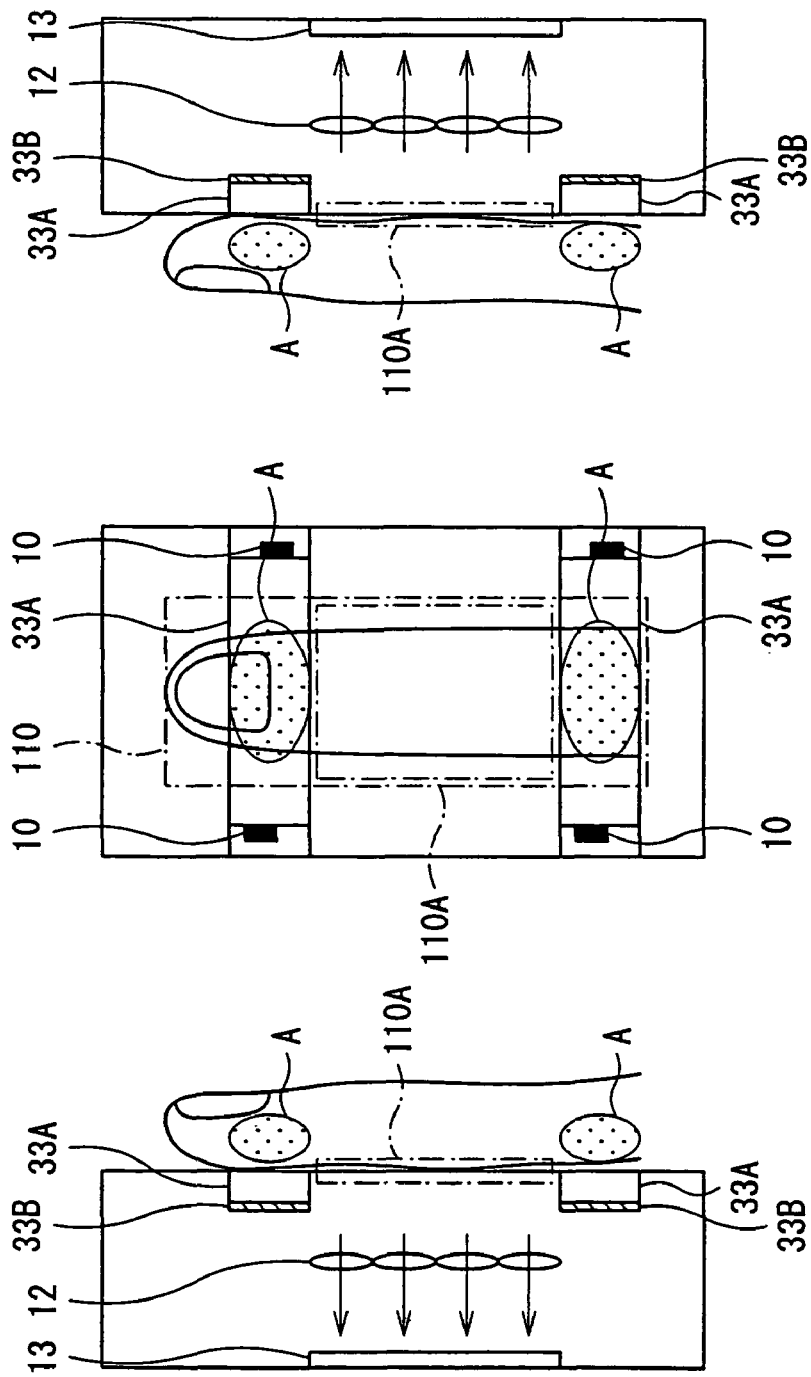

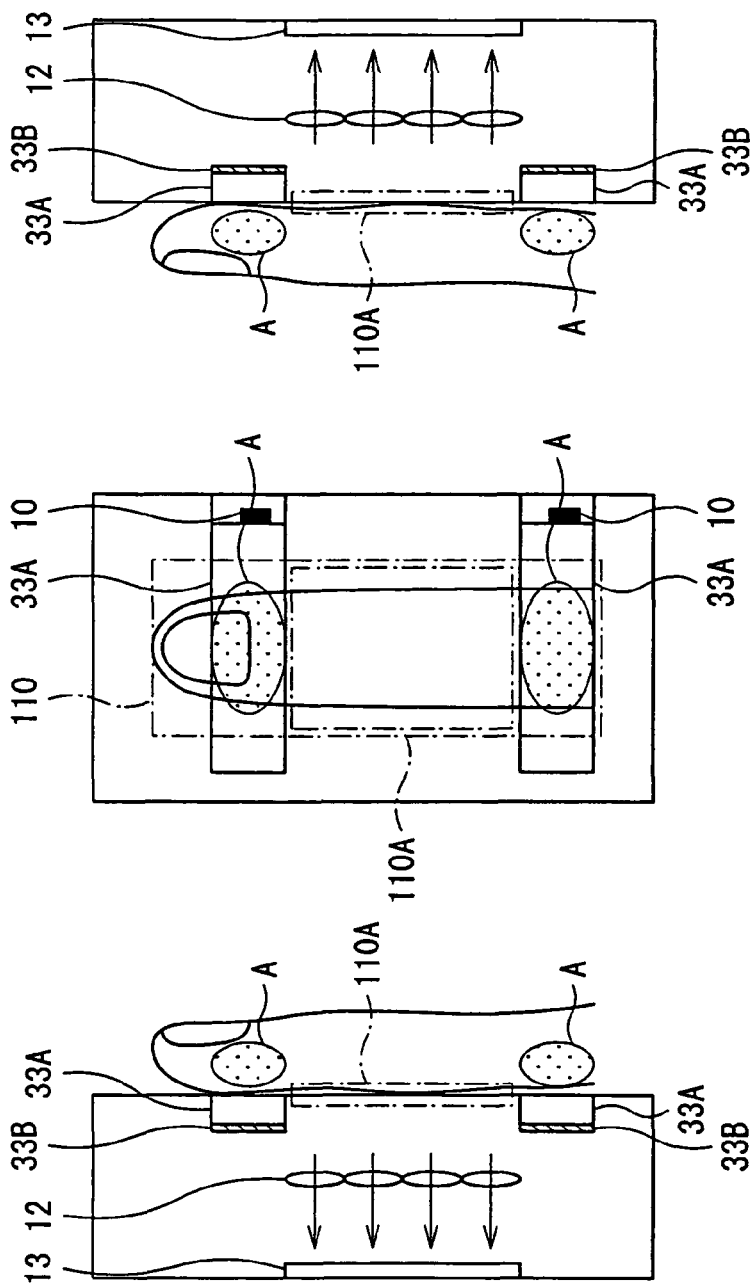

BIOMETRICS AUTHENTICATION SYSTEM

TECHNICAL FIELD

The present invention relates a biometrics authentication system using a structure inside a living body such as, for example, veins of a finger as an object subjected to authentication. The present application contains subject matter related to that disclosed in Japanese Priority Patent Application JP 2007-098422 filed in the Japanese Patent Office on Apr. 4, 2007, the entire contents of which is hereby incorporated by reference.

BACKGROUND ART

In related art, image pickup apparatuses picking up an image of a structure in a living body part are used in biometrics authentication systems or the like, and, for example, various fingerprint authentication systems performing authentication of a living body through the use of fingerprints of fingers have been proposed (refer to Patent Documents 1 to 3). In such a fingerprint authentication system, the thickness of an image pickup apparatus is large, so arranging the image pickup apparatus outside the authentication system as described in Patent Document 1, and independently arranging an optical system (an image pickup lens) and a detection system (an image pickup device) as described in Patent Document 2 have been mainstream.

However, in recent years, a reduction in profiles of authentication systems is in increasing demand, thereby it is desired for image pickup apparatuses mounted in the authentication systems to have a smaller profile. Therefore, in Patent Document 3, an image pickup apparatus using a light guide plate has been disclosed. More specifically, a light source is brought into contact with an end section of the light guide plate, and light is repeatedly reflected in the light guide plate, thereby the light guide plate is allowed to function as a surface-emitting light source, and a living body (a finger) is placed on the light guide plate to pick up an image. The arrangement of a light source which generally has a wide angle distribution is fixed by such a configuration, so a reduction in the profile of the image pickup apparatus is achieved.

On the other hand, in such an authentication system, a high security level is in demand. In authentication using a fingerprint, a fingerprint pattern as an object subjected to authentication is easily forged, so there is the risk of a reduction in the security level of authentication. Therefore, in Patent Document 4, a vein authentication system performing authentication of a living body through the use of veins of a finger has been proposed. In this case, veins are structures inside the finger, so it is difficult to forge an authentication pattern, and compared to fingerprint authentication, authentication with a higher security level may be performed.

Patent Document 1: Japanese Unexamined Patent Application Publication No. 2005-312748
Patent Document 2: Japanese Unexamined Patent Application Publication No. 2006-181296
Patent Document 3: Japanese Unexamined Patent Application Publication No. 2006-285487
Patent Document 4: Japanese Unexamined Patent Application Publication No. 2006-146612

DISCLOSURE OF THE INVENTION

Now, in the image pickup apparatus in the above-described Patent Document 3, while light is scattered in a part in contact with the light guide plate (a ridge part) of the corrugated shape of a fingerprint, light is totally reflected in the light guide plate in a part not in contact with the light guide plate (a groove part) of the corrugated shape of the fingerprint, so when an image of the scattered light is picked up, a shape pattern of the fingerprint is detected. Therefore, in the authentication system using the light guide plate, it is desired that an object subjected to image pickup and the light guide plate are in contact with each other.

On the other hand, in the vein authentication system in Patent Document 4, it is necessary to pick up an image by applying light to veins inside a finger. In the configuration of Patent Document 3, light is scattered on a surface in contact with the light guide plate, so light is not allowed to be sufficiently applied to the structure such as veins inside a living body. Moreover, an accurate vein pattern is not detectable due to the influence of a fingerprint pattern. Further, when the finger is in strong contact with the light guide plate, veins are easily pressed, because veins are blood vessels, so a pattern is not detectable with good reproducibility. As described above, it is difficult to divert the low-profile configuration using the light guide plate to the vein authentication system as it is. Therefore, the implementation of a low-profile biometrics authentication system capable of securing a high security level is desired.

The present invention is made to solve the above issues, and an object of the invention is to provide a low-profile biometric image pickup apparatus capable of achieving high security level authentication.

A biometrics authentication system of the invention includes: a light source; a light guide section totally reflecting light emitted from the light source to guide the light to a living body; a diffraction section diffracting light propagating through the light guide section; an image pickup lens section arranged so as to be opposed to the living body with the light guide section in between, and condensing light from the living body; an image pickup device producing image pickup data based on the light condensed by the image pickup lens section; and an authentication section performing authentication of the living body based on the image pickup data obtained from the image pickup device.

In the biometrics authentication system of the invention, light emitted from the light source propagates through the light guide section by total reflection to be guided toward the living body. Then, light propagating through the light guide section is diffracted by the diffraction section, thereby diffraction light propagating at a different angle from an incident angle is generated. Thereby, the light does not satisfy total reflection conditions, and the diffraction light is guided to the outside of the light guide section, so light is sufficiently applied to the inside of the living body.

According to the biometrics authentication system of the invention, light from the light source is totally reflected by the light guide section to be guided to the living body, so the light guide section functions as a surface-emitting light source for the living body, and a reduction in the profile of the light source is allowed. Moreover, light propagating through the light guide section by total reflection is diffracted by the diffraction section, so light is allowed to be sufficiently applied to the inside of the living body. Thereby, an image of a structure inside the living body is allowed to be picked up. Therefore, high security level authentication is achievable with a low profile.

BRIEF DESCRIPTION OF THE DRAWINGS

FIG. 6 is a sectional view for describing a method of forming the light guide section and the diffraction section illustrated in FIG. 4.

FIG. 16 is schematic views of the biometrics authentication system illustrated in FIG. 15 viewed from above and sides.

FIG. 18 is schematic views of the biometrics authentication system illustrated in FIG. 17 viewed from above and sides.

FIG. 19 is a schematic view illustrating a brief configuration of a biometrics authentication system according to a fifth modification example of the invention.

FIG. 20 is schematic views of another configuration example of the biometrics authentication system in FIG. 19 viewed from above and sides.

FIG. 21 is a schematic view illustrating a brief configuration of a biometrics authentication system according to a sixth modification example of the invention.

FIG. 22 is schematic views of another configuration example of the biometrics authentication system in FIG. 20 viewed from above and sides.

FIG. 23 is schematic views of another configuration example of the biometrics authentication system in FIG. 20 viewed from above and sides.

BEST MODE(S) FOR CARRYING OUT THE INVENTION

An embodiment of the invention will be described in detail below referring to the accompanying drawings.

Figure 1:
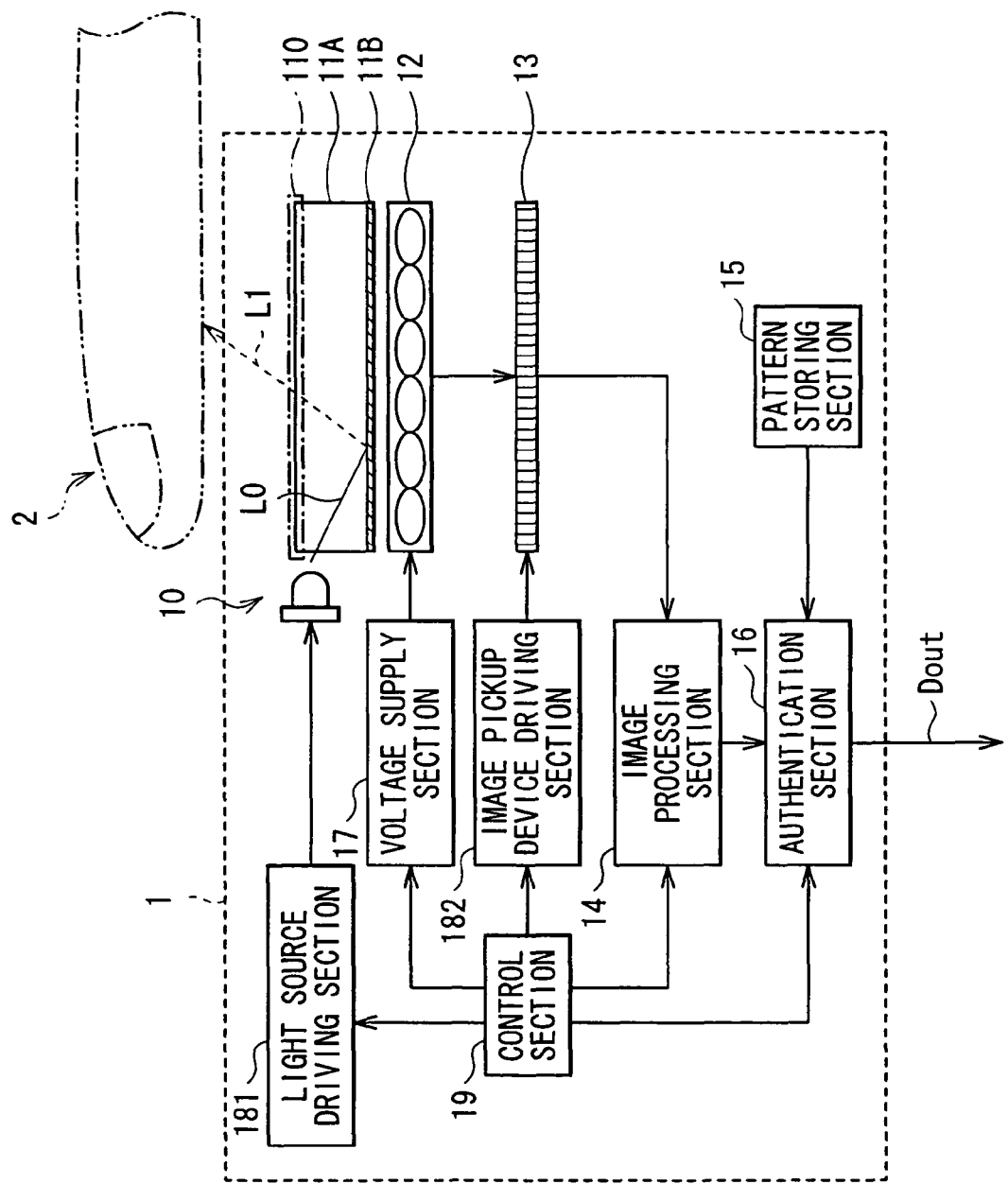
FIG. 1 is a functional block diagram illustrating the whole configuration of a biometrics authentication system according to an embodiment of the invention.
Figure 2:
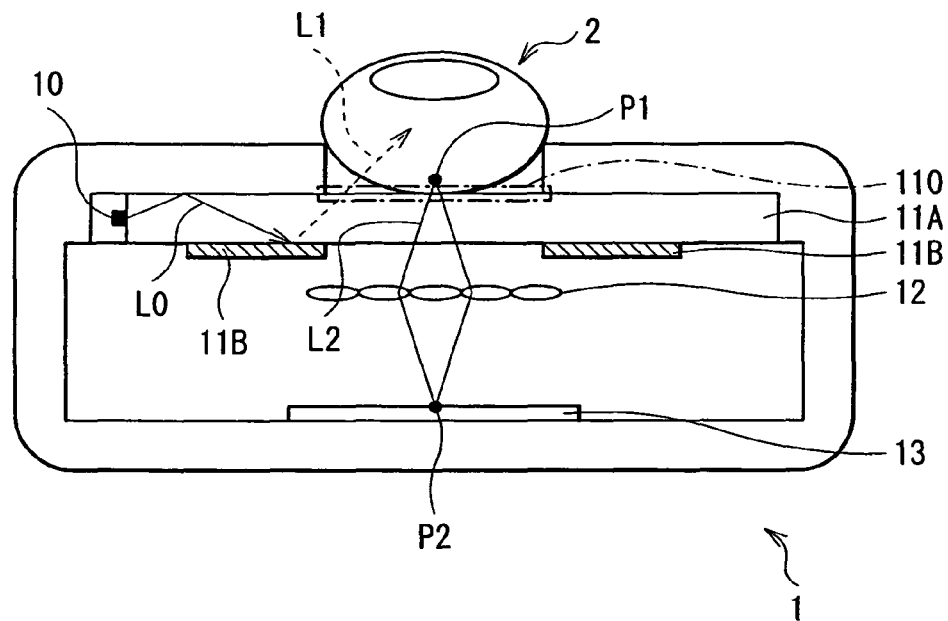
FIG. 2 is a schematic view illustrating a brief configuration of the biometrics authentication system illustrated in FIG. 1.

FIG. 1 illustrates the whole configuration of a biometrics authentication system (a biometrics authentication system 1) according to an embodiment of the invention. FIG. 2 is a schematic view illustrating a brief configuration of the biometrics authentication system 1. The biometrics authentication system 1 specifically picks up an image of a structure, for example, veins inside a living body (for example, a finger) 2, and then performs authentication, and includes a light source 10, a light guide section 11A, a diffraction section 11B, a microlens array 12, an image pickup device 13, an image processing section 14, a pattern storing section 15, an authentication section 16, a voltage supply section 17, a light source driving section 181, an image pickup device driving section 182 and a control section 19. A top surface of the light guide section 11A is a detection section 110. The detection section 110 is a surface or a member where a living body is placed. In other words, in the embodiment, the light guide section 11A is arranged on an optical path between the detection section 110 and the microlens array 12 so as to be opposed to the detection section 110.

The light source 10 applies light to the living body 2 as an object subjected to image pickup, and is made of, for example, an LED (Light Emitting Diode) or the like. In addition, the light source 10 preferably emits light in a near-infrared wavelength region (a wavelength region of approximately 700 nm to 1200 nm). It is because in the case where light in such a wavelength region is used, an increase in light use efficiency in the case where an image of veins of the living body 2 is picked up is allowed by a balance between the transmittance through the living body and the absorption into reduced hemoglobin (veins) in the living body. Moreover, in FIG. 2, the light source 10 is configured so as to be arranged at an end of the light guide section 11, but the light sources 10 may be arranged at both ends of the light guide section 11. In such a case, light may be uniformly applied to the living body 2.

The light guide section 11A totally reflects light emitted from the light source 10 to guide the light toward the living body 2. The light guide section 11A is made of, for example, a substrate having transparency such as glass or plastic, and has, for example, a thickness of 1 to 3 mm. In addition, a surface of the light guide section 11A may be subjected to special processing such as a reflective film. Moreover, a cover glass or the like for dust prevention or protecting the inside of the system may be arranged on the light guide section 11A. However, in this case, the cover glass or the like arranged on the light guide section 11A is a detection section. A specific configuration of the light guide section 11 will be described later.

The diffraction section 11B is arranged on a bottom surface of the light guide section 11A, and diffracts light propagating through the light guide section 11A, and the diffraction section 11B is made of, for example, a diffraction device such as a diffraction grating or a hologram. A specific configuration of the diffraction section 11B will be described later.

Figure 3:
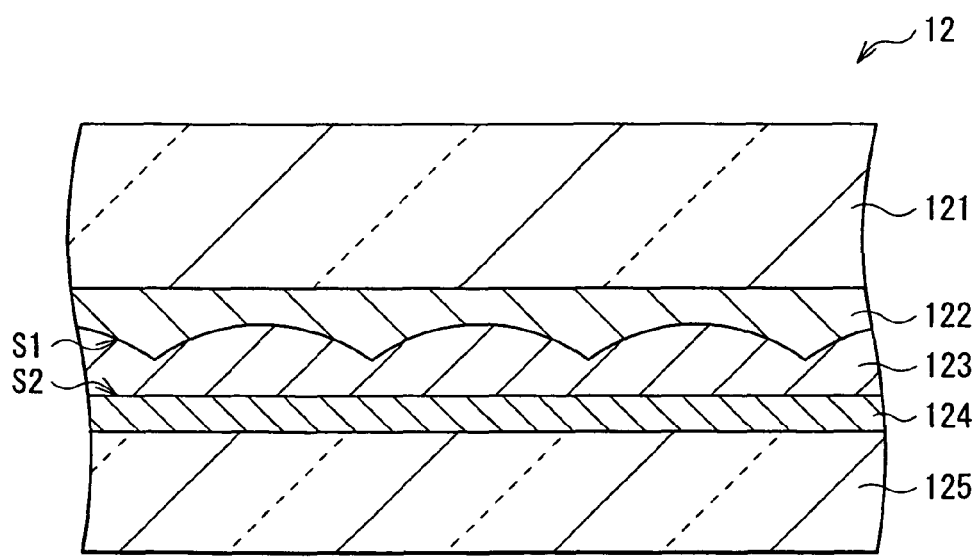
FIG. 3 is an enlarged sectional view of a microlens array illustrated in FIG. 1.

The microlens array 12 includes a plurality of microlenses arranged in a matrix form, and is arranged below the light guide section 11 (more specifically, between the light guide section 11 and the image pickup device 13). Each microlens in the microlens array 12 functions as an image pickup lens for the living body 2 as the object subjected to image pickup, and is made of, for example, a liquid crystal lens, a liquid lens, a diffractive lens or the like. A specific configuration of the microlens array 12 will be described below referring to FIG. 3. FIG. 3 illustrates a sectional configuration of the microlens array 12.

In the microlens array 12, a liquid crystal layer 123 is formed between a pair of substrates 121 and 125 opposed to each other, and electrodes 122 and 124 are formed between the liquid crystal layer 123 and the substrate 121 and between the liquid crystal layer 123 and the substrate 125, respectively.

The substrates 121 and 125 each are made of, for example, a transparent substrate such as a glass substrate, and allow an incident light ray to pass therethrough. A voltage is supplied to the electrodes 122 and 124 from the voltage supply section 17 which will be described later. These electrodes 122 and 124 each are made of, for example, a transparent electrode such as ITO (Indium Tin Oxide), and as in the case of the substrates 121 and 125, the electrodes 122 and 124 allow an incident light ray to pass therethrough. On a surface S1 of the electrode 122 of surfaces S1 and S2 of the electrodes 122 and 124, a plurality of concave curved surfaces are formed in a matrix form, thereby a plurality of liquid crystal microlenses are formed. The liquid crystal layer 123 is made of, for example, a liquid crystal material such as nematic liquid crystal, and the refractive index of the liquid crystal layer 123 is changed according to a voltage applied between the electrodes 122 and 124.

The image pickup device 13 detects light from the microlens array 12 to produce image pickup data, and is arranged on a focal plane of the microlens array 12. In addition, the image pickup device 13 includes, for example, a plurality of CCDs (Charge Coupled Devices), CMOSs (Complementary Metal Oxide Semiconductors) or the like arranged in a matrix form.

The image processing section 14 performs predetermined image processing on the image pickup data obtained in the image pickup device 13 in response to the control of the control section 19 to output the image pickup data to the authentication section 16. In addition, the image processing section 14, and the authentication section 16 and the control section 19 both of which will be described later each are made of, for example, a microcomputer or the like.

The pattern storing section 15 is a section storing a biometrics authentication pattern (which is a comparison pattern relative to an image pickup pattern obtained at the time of authentication, and which is obtained by picking up an image of a living body in advance) used at the time of biometrics authentication, and is made of a nonvolatile memory device (for example, an EEPROM (Electrically Erasable Programmable Read Only Memory) or the like). The authentication section 16 is a section performing authentication of the living body 2 by comparing an image pickup pattern outputted from the image processing section 14 to the biometrics authentication pattern stored in the pattern storing section 15 in response to the control of the control section 19.

The voltage supply section 17 supplies a voltage to the microlenses in the microlens array 12. The refractive powers of the microlenses are changed according to the magnitude of the voltage supplied from the voltage supply section 17. Therefore, a focal point (an image forming position) in a depth direction from a surface of the living body 2 to the inside of the living body 2 is freely changeable by adjusting a supply voltage.

The light source driving section 181 drives the light source 10 to emit light in response to the control of the control section 19. The image pickup device driving section 182 drives the image pickup device 13 to pick up an image (to detect light) in response to the control of the control section 19. The control section 19 controls the operations of the image processing section 14, the authentication section 16, the voltage supply section 17, the light source driving section 181 and the image pickup device driving section 182.

Figure 4:
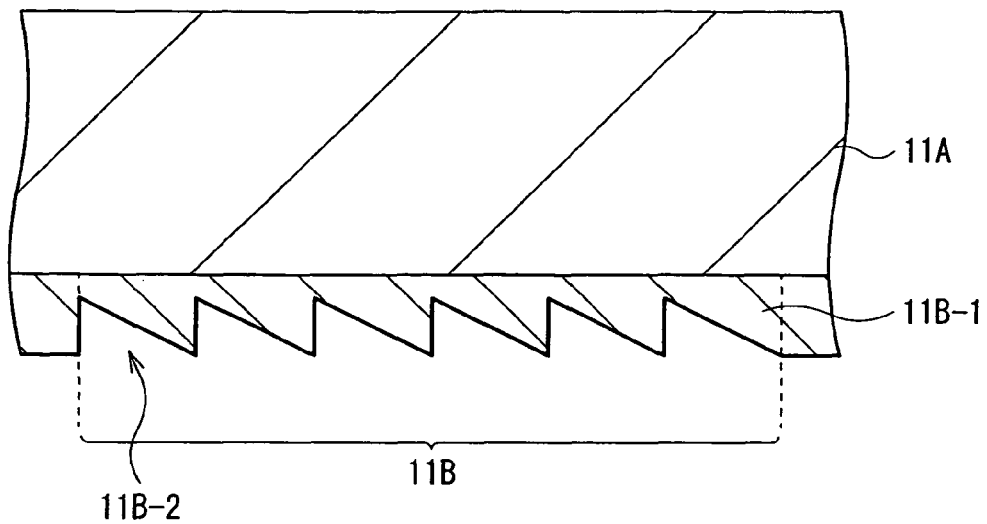
FIG. 4 is an enlarged sectional view illustrating an example of a light guide section and a diffraction section illustrated in FIG. 1.
Figure 5:
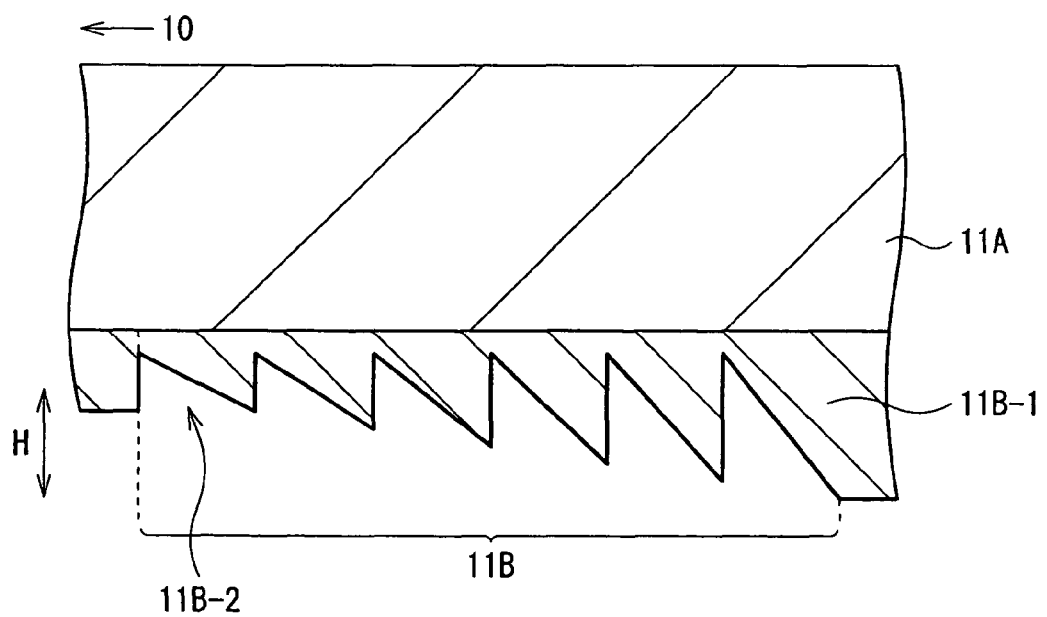
FIG. 5 is an enlarged sectional view illustrating an example of the light guide section and the diffraction section illustrated in FIG. 1.

Next, the configurations of the light guide section 11A and the diffraction section 11B will be described in detail referring to FIGS. 2, 4 and 5. FIGS. 4 and 5 are enlarged views of sectional configurations of the light guide section 11A and the diffraction section 11B.

As illustrated in FIG. 2, the diffraction section 11B is arranged in a region not opposed to the detection section 110, that is, a region not blocking an optical path of incident light from the living body 2 to the microlens array 12. The diffraction section 11B is made of a resin layer 11B-1 which is formed on the bottom surface of the light guide section 11A, and includes a plurality of groove sections 11B-2. The plurality of groove sections 11B-2 form a blazed grating with a saw-toothed sectional shape as illustrated in FIG. 4. Moreover, as illustrated in FIG. 5, the depths H of the groove sections 11B-2 preferably increase with increase in distance from the light source 10.

However, the grating shape of the diffraction section 11B is not limited to the above-described grating shape. In addition to the above-described grating shape, for example, a diffraction grating such as a step-like step grating or a binary grating may be used.

Next, an example of a method of forming the light guide section 11A with a the configuration illustrated in FIG. 4 and the diffraction section 11B with a configuration illustrated in FIG. 4 will be described referring to FIGS. 6 and 7.

First, as illustrated in FIG. 6(A), a substrate 100 is coated with a photoresist film 101 by, for example, a photolithography method, and then the photoresist film 101 is exposed and developed by a stepper through the use of a mask 102 having a desired pattern, thereby as illustrated in FIG. 6(B), saw-toothed grooves are formed in the photoresist film 101 on the substrate 100. Next, as illustrated in FIG. 6(C), the shapes of the grooves in the photoresist film 101 are transferred to metal through the use of, for example, electroplating such as electroforming to form a mold 103.

Figure 7:
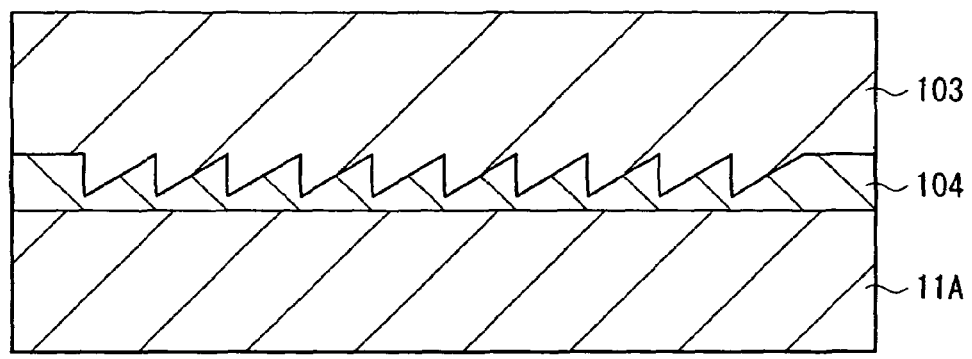
FIG. 7 is a sectional view for describing a forming method following a step of FIG. 6.

Next, as illustrated in FIG. 7, for example, an ultraviolet curable resin 104 is poured into the formed mold 103 on a side where the grooves are formed, and the ultraviolet curable resin 104 is superimposed on the light guide plate 11A, and then ultraviolet light UV is applied from the light guide plate 11A side to cure the ultraviolet curable resin 104. Thereby, the light guide section 11A with the configuration illustrated in FIG. 4 and the diffraction section 11B with the configuration illustrated in FIG. 4 are formed.

Figure 9:
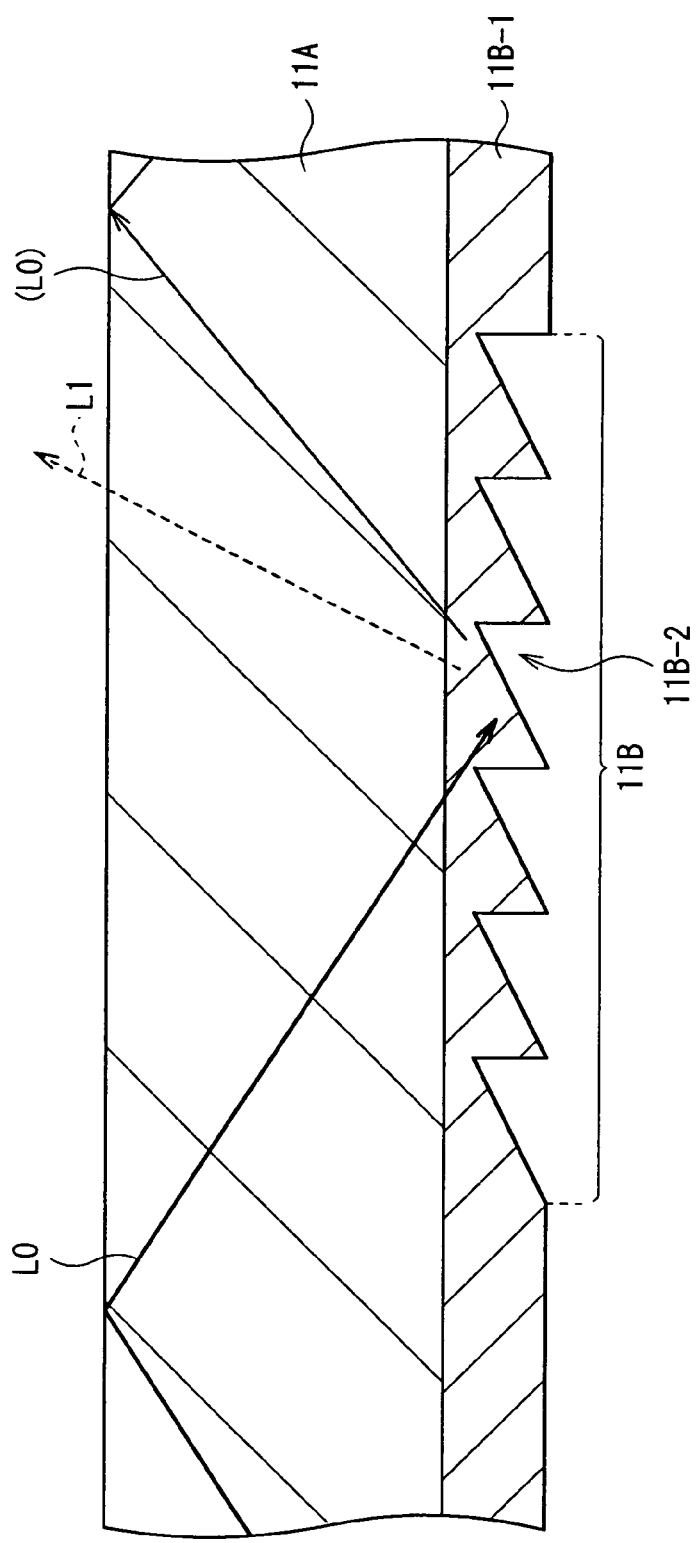
FIG. 9 is a sectional view for describing functions of the light guide section and the diffraction section.
Figure 10:
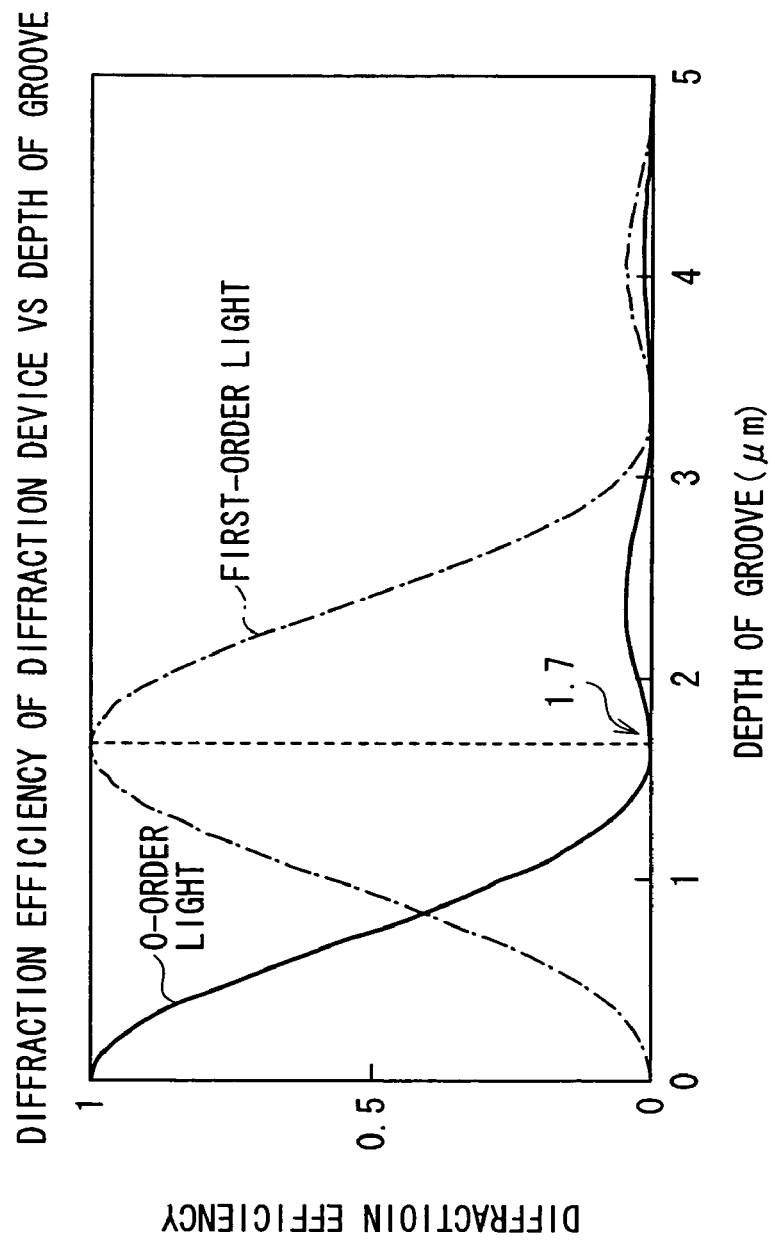
FIG. 10 is a sectional view for describing the functions of the light guide section and the diffraction section.
Figure 11:
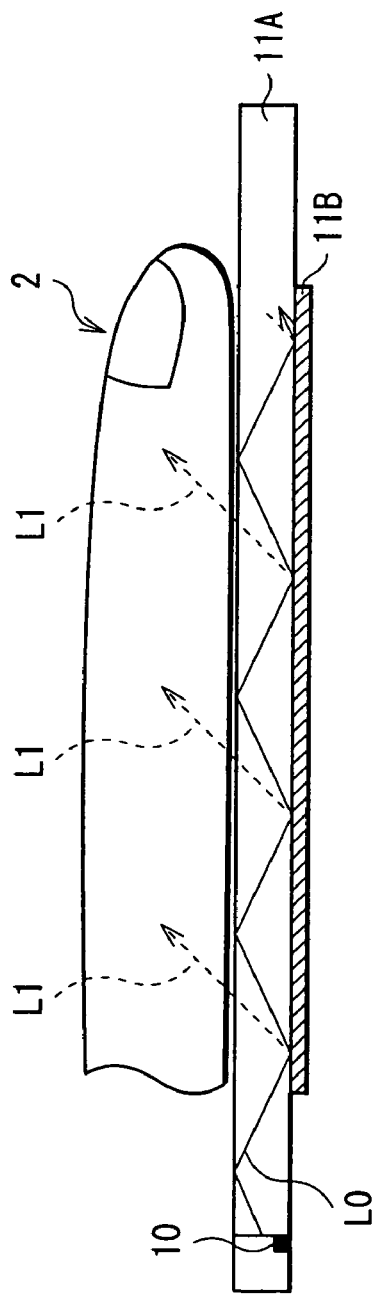
FIG. 11 is an illustration for describing the propagation direction of light to a living body.

Next, referring to FIGS. 1 to 5 and FIGS. 8 to 11, operation and effects of the biometrics authentication system 1 according to the embodiment will be described below. Here, FIG. 8 is an illustration for describing functions of the microlens array 12, FIGS. 9 and 10 are illustrations for describing functions of the light guide section 11A and the diffraction section 11B, and FIG. 11 is illustration of a positional relationship between the light guide section 11A and the living body 2.

In the biometrics authentication system 1, first, when the living body (for example, a fingertip) 2 is placed on the light guide section 11A, and the light source driving section 181 drives the light source 10, light L0 emitted from the light source 10 enters from an end of the light guide section 11A. The light L0 generally has wide directivity, so most of the light L0 propagates by being repeatedly totally reflected in the light guide section 11A. Then, the light having propagated through the light guide section 11A is guided toward the living body 2 placed on the light guide section 11A to be applied to the living body 2.

On the other hand, when a voltage is supplied from the voltage supply section 17 to the microlenses in the microlens array 12 (more specifically between the electrodes 122 and 124) in response to the control of the control section 19, the refractive index of the liquid crystal layer 123 is changed according to the magnitude of the voltage, and the focal points of the microlenses are adjusted to a point (for example, a point P1 in FIG. 2) inside the living body 2, and light L2 enters from the living body 2 to the microlenses.

Figure 8:
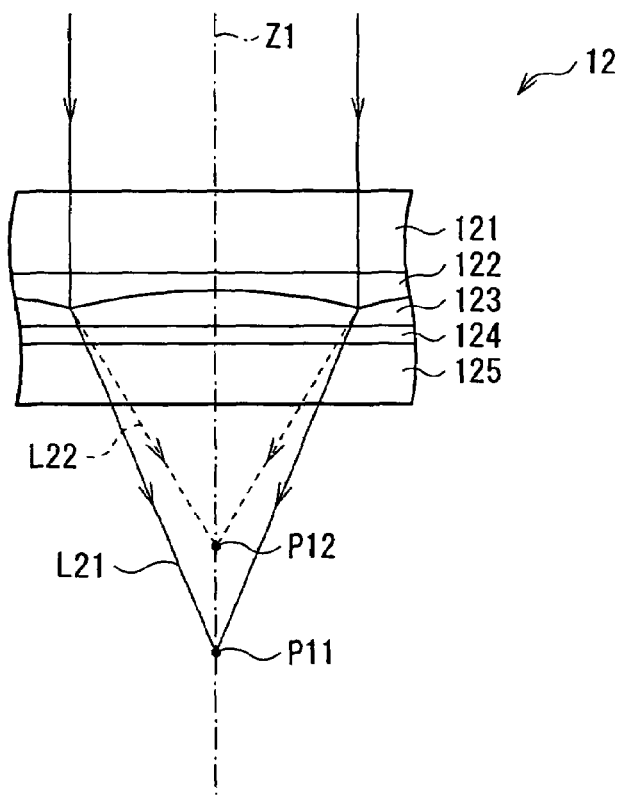
FIG. 8 is a schematic sectional view for describing functions of a microlens array.

At this time, for example, as illustrated in FIG. 8, when the supply voltage is relatively small, the refractive index of the liquid crystal layer 123 is small, and as a result, as in the case of a light ray L21, incident light rays to the microlenses are refracted so as to have a relatively small refraction angle, and are condensed at a relatively long focal length (for example, at a focal point position P11 on an optical axis Z1). On the other hand, in the case where the supply voltage is relatively large, the refractive index of the liquid crystal layer 123 is large, and as a result, as in the case of a light ray L22, incident light rays to the microlenses are refracted so as to have a relatively large refraction angle, and are condensed at a relatively short focal length (for example, at a focal point position P12 on the optical axis Z1). Thus, when the supply voltage is adjusted through the use of liquid crystal lenses as the microlenses, the refractive powers of the microlenses are variable.

As described above, the focal points of the microlenses are adjusted on the point P1 inside the living body 2 and a point (for example, a point P2 in FIG. 2) on the image pickup device 13, thereby in the image pickup device 13, image pickup data (a vein pattern) of veins of the living body 2 is obtained. Then, image processing is appropriately performed on the obtained vein pattern in the image processing section 14, and then the vein pattern is inputted into the authentication section 16.

Next, in the authentication section 16, authentication is performed by comparing the inputted vein pattern to an authentication pattern for vein authentication stored in the pattern storing section 15. Thereby, a final result of biometrics authentication (authentication result data Dout) is outputted to complete a biometrics authentication process.

In particular, in the embodiment, when the light L0 which is emitted from the light source 10 and has propagated through the light guide section 11A enters the diffraction section 11B arranged on the bottom surface of the light guide section 11A, the light L0 is diffracted to be emitted. In other words, as illustrated in FIG. 9, the light L0 is divided by the grooves 11B-2 of the diffraction section 11B into m-order (m=0, ±1, ±2, ±3 . . . ) diffraction light, mainly 0-order diffraction light (L0) and first-order diffraction light L1. At this time, the 0-order diffraction light is emitted at the same angle as the incident angle of the incident light L0, so the 0-order diffraction light propagates through the light guide plate 11A again while maintaining total reflection conditions. On the other hand, since the first-order diffraction light L1 is emitted at a different angle from the angle of the incident light L0, the total reflection conditions are not satisfied, so the first-order diffraction light L1 is taken out from the top surface of the light guide section 11A.

The light L1 guided out from the top surface of the light guide section 11A in such a manner is applied to the living body 2 placed on the light guide section 11A. In this case, in related art (for example, Patent Document 3), light from a light source is only repeatedly totally reflected to propagate through a light guide plate, and the light is not guided to the outside of the light guide plate, so the light is applied only to a part in contact with the light guide plate. On the other hand, in the embodiment, the light L1 is guided to the outside of the light guide section 11A by the diffraction section 11B, so light is sufficiently applied to not only a surface in contact with the light guide section 11A (a surface of the living body 2) but also a part not in contact with the light guide section 11A, that is, a structure inside the living body. Then, the light L1 applied to the living body 2 is scattered inside the living body 2 to be absorbed by veins.

In this case, the diffraction efficiency of the diffraction section 11B is dependent on the depths of the grooves in the groove section 11B-2 in each diffraction order. FIG. 10 illustrates a relationship of diffraction efficiency to the depth (μm) of the groove in 0-order diffraction light and first-order diffraction light. In this case, the refractive index of the light guide section 11A is 1.51, and the wavelength of incident light is 850 nm. As illustrated in the drawing, in the case where the depth of the groove is 0 μm to 1.7 μm, there is a tendency that the 0-order light decreases, and the first-order light increases. Therefore, for example, the diffraction efficiency is allowed to be gradually increased by increasing the depth of the groove until the depth of the groove reaches approximately 1.7 μm, and when the depth of the groove is approximately 1.7 μm, virtually all diffraction light is allowed to be first-order diffraction light. Thus, when the depths of the grooves of the groove section 11B-2 forming the diffraction section 11B are adjusted, desired diffraction efficiency is obtainable.

Therefore, for example, as illustrated in FIG. 5, when the depth H of the groove section 11B-2 is gradually increased from a side close to the light source 10, the diffraction efficiency is allowed to be gradually increased. Since the light amount of the light L0 propagating through the light guide section 11A is reduced with increase in distance from the light source 10, the light amount of the light L1 guided out from the light guide section 11A becomes uniform by increasing the diffraction efficiency in a part which is relatively far from the light source 10.

As described above, in the embodiment, in the light guide section 11 where the living body 2 is placed, the light L0 emitted from the light source 11 propagates by being repeatedly totally reflected. Thereby, the light guide section 11A functions as a surface-emitting light source, thereby the profile of the light source 10 is reduced. Moreover, the diffraction section 11B diffracting the light L0 propagating through the light guide section 11A is arranged on the bottom surface of the light guide section 11A, so the light L0 having entered the diffraction section 11B is divided mainly into the 0-order diffraction light and the first-order diffraction light L1. Thereby, the total reflection conditions in the light guide plate 11A is not satisfied, and the light L1 is guided to the outside of the light guide section 11A, so light is sufficiently applied to the inside of the living body 2 which is not directly in contact with the light guide section 11A. Therefore, an image of a structure inside the living body 2 such as veins may be picked up through the use of the light guide section 11A, thereby the high security level authentication is achievable with a low profile.

Moreover, the microlens array includes liquid crystal lenses, thereby an image is allowed to be picked up by changing the focal point in the depth direction of the living body 2 without moving the microlens array 12 on an optical path, so this is advantageous for a reduction in profile. Moreover, thereby, double biometrics authentication by not only vein authentication but also fingerprint authentication is allowed to be performed, so a higher security level is securable. Further, the microlens array is formable to have a very thin lens conjugation length (a distance from a lens plane on an object side to image pickup plane) of approximately 1 mm, so the whole system is allowed to have a thin thickness of approximately 3 mm.

Further, the diffraction efficiency of the diffraction section 11B increases with increase in distance from the light source 10, so unevenness in the light amount of light applied to the living body 2 is reduced, thereby more accurate image pickup data is obtainable. This is specifically effective in the case where image pickup is performed at a relatively long distance or in a relatively wide range such as the case where light is applied to the living body 2 (a fingertip) in a longer direction (refer to FIG. 11).

Moreover, in the case where the light source 10 emits near-infrared light, the absorption of the light into the veins of the living body 2 is allowed to be increased while increasing transmittance of light through the living body 2. Therefore, in such a configuration, veins as an object subjected to image pickup in vein authentication are allowed to appear more clearly, thereby to improve the accuracy of vein authentication.

Figure 12:
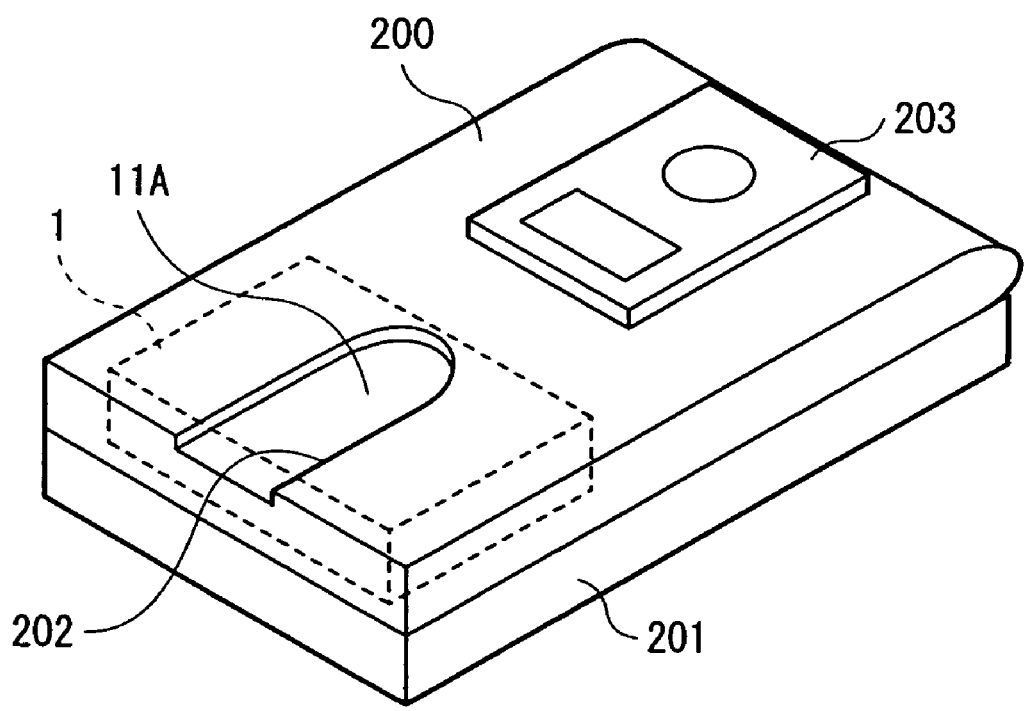
FIG. 12 is a perspective view illustrating an application example of the biometrics authentication system illustrated in FIG. 1.

The biometrics authentication system 1 is suitably used for low-profile portable modules such as a cellular phone, a low-profile notebook computer, a portable memory, and various cards. FIG. 12 illustrates a brief configuration of an example of a cellular phone using the biometrics authentication system 1. The cellular phone includes a finger guide 202 for placing the living body 2 (a fingertip) and a display section 203 for displaying an authentication result on a surface of a flip-type enclosure (a first enclosure 200 and a second enclosure 201), and the biometrics authentication system 1 is arranged in the first enclosure 200 so that a bottom surface of the finger guide 202 and the light guide section 11 are opposed to each other.

Next, modification examples of the biometrics authentication system of the invention will be described referring to drawings. In the following description and drawings, like components are denoted by like numerals as of the above-described biometrics authentication system 1 and will not be further described.

MODIFICATION EXAMPLE 1

Figure 13:
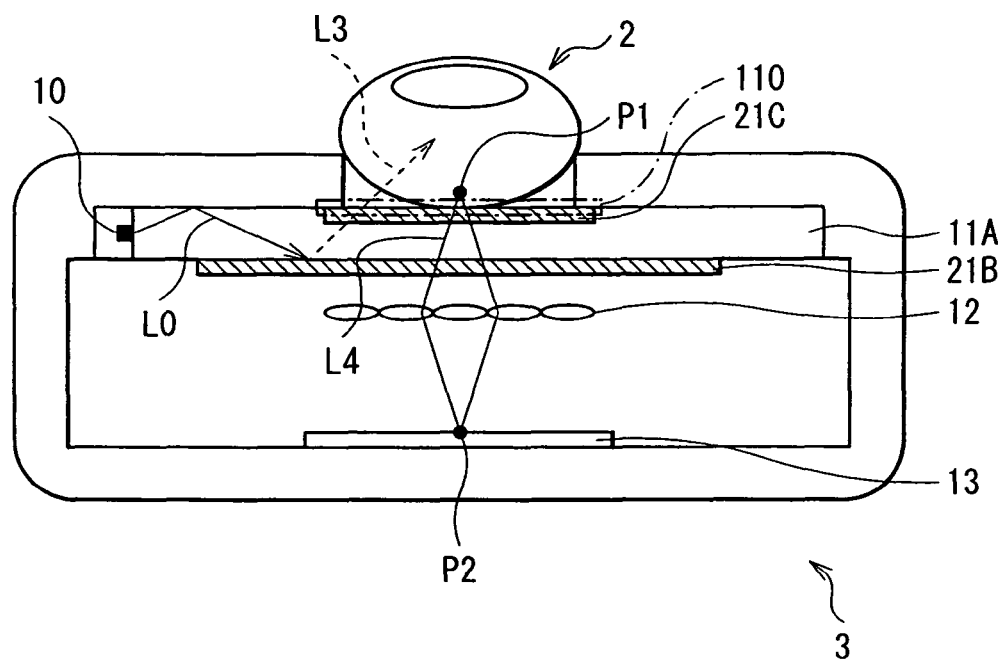
FIG. 13 is a schematic view illustrating a brief configuration of a biometrics authentication system according to a first modification example of the invention.

FIG. 13 is a schematic view illustrating a brief configuration of a biometrics authentication system 3 according to Modification Example 1. The biometrics authentication system 3 has the same configuration as that of the above-described biometrics authentication system 1 except for arranging a wave plate 21C between the detection section 110 and the light guide section 11A, and the configuration of a diffraction section 21B.

The diffraction section 21B has a plurality of groove sections (not illustrated), and diffracts only a specific polarized component (a P-polarized component or an S-polarized component) of light propagating through the light guide section 11A. A region where the diffraction section 21B is arranged is not specifically limited, and may be arranged on the optical path of incident light from the living body 2 to the microlens array 12. In addition, as in the case of the above-described biometrics authentication system 1, the diffraction efficiency of diffraction section 21A is also changeable by adjusting the depths of the groove sections.

The wave plate 21C changes the polarization state of light guided out from the light guide section 11A, and is made of a ¼ wave plate providing a phase difference of 90°. The wave plate 21C is arranged so as to be opposed to the diffraction section 21B with the light guide section 11A in between.

By such a configuration, when the light L0 emitted from the light source 10 propagates through the light guide section 11A, and then enters the diffraction section 21B, only the specific polarized component, for example, light L3 of a P-polarized component is diffracted. Thereby, the light L3 does not satisfy the total reflection conditions, and the light L3 passes through the wave plate 21C (the ¼ wave plate) arranged on the top surface of the light guide section 11A to be guided to the outside of the light guide section 11A. At this time, when the light L3 passes through the wave plate 21C, the light L3 has a phase difference of 90°, thereby to become circular polarized light. Then, light L4 reflected by the living body 2 passes through the wave plate 21C, the light guide section 11A and the diffraction section 21B again to enter the microlens array 12. At this time, when the light L4 passes through the wave plate 21C, the light L4 has a phase difference of 90°, thereby to become linearly polarized light having an S-polarized component which is 90° different from a polarized component (a P-polarized component) of the light L1. Therefore, even if the light L4 enters the diffraction section 21B, the light L4 passes through the diffraction section 21B without the influence of the diffraction section 21B to enter the microlens array 12.

As described above, in the biometrics authentication system 3, the diffraction section 21B diffracting only a specific polarized component and the wave plate 21C arranged so as to be opposed to the diffraction section 21B are included, thereby when light is guided from the light guide section 11A to outside, while the diffraction function of the diffraction section 21B is exerted, the diffraction function is not exerted on an optical path for obtaining image pickup data from the living body 2 to the microlens array 12. Thereby, it is not necessary to arrange the diffraction section 21B so as to avoid an incident optical path from the living body 2 to the microlens array 12, and the diffraction section 21B may be formed in any region of the light guide section 11A. Therefore, the diffraction section 21B is formable without finely aligning the diffraction section 21A with respect to the light guide plate 11A. Moreover, the diffraction section 21B is allowed to be arranged opposed to a region subjected to image pickup of the living body 2, so authentication accuracy is not deteriorated even if reproducibility at a position where the finger is placed is poor.

MODIFICATION EXAMPLE 2

Figure 14:
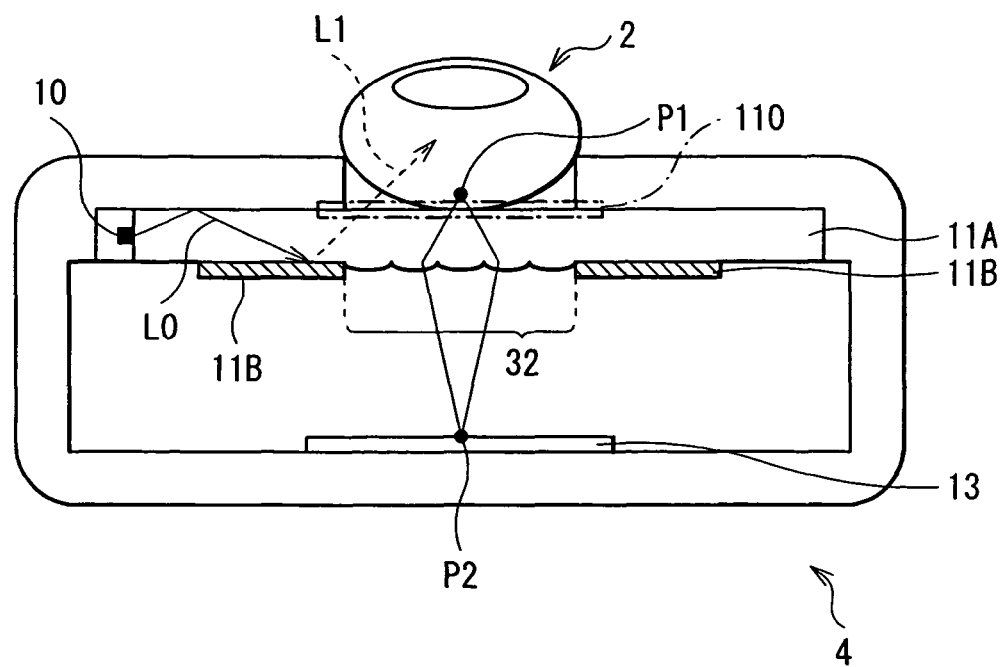
FIG. 14 is a schematic view illustrating a brief configuration of a biometrics authentication system according to a second modification example of the invention.

FIG. 14 is a schematic view illustrating a brief configuration of a biometrics authentication system 4 according to Modification Example 2. The biometrics authentication system 4 has the same configuration as that of the above-described biometrics authentication system 1, except that a microlens array section 32 is arranged adjacent to the bottom surface of the light guide section 11A.

The microlens array section 32 corresponds to the microlens array 12 in the above-described biometrics authentication system 1, and in the modification example, the microlens array section 32 is arranged in the same plane as that where the diffraction section 11B is formed in the light guide section 11A. Thereby, compared to the case where the light guide section 11A and the microlens array are arranged on different layers, the modification example is advantageous for a reduction in profile. Moreover, when the microlens array section 32 is integrally formed with the light guide plate 11A, manufacturability is improved. As microlenses, as described above, for example, variable focus lenses such as liquid crystal lenses or liquid lenses, diffraction lenses or the like may be used. In particular, in the case where the microlenses are made of diffraction lenses, the diffraction section 11B and the microlens array section 32 are integrally formable on the bottom surface of the light guide section 11A through the use of one mask, so manufacturability is further improved.

MODIFICATION EXAMPLE 3

Figure 15:
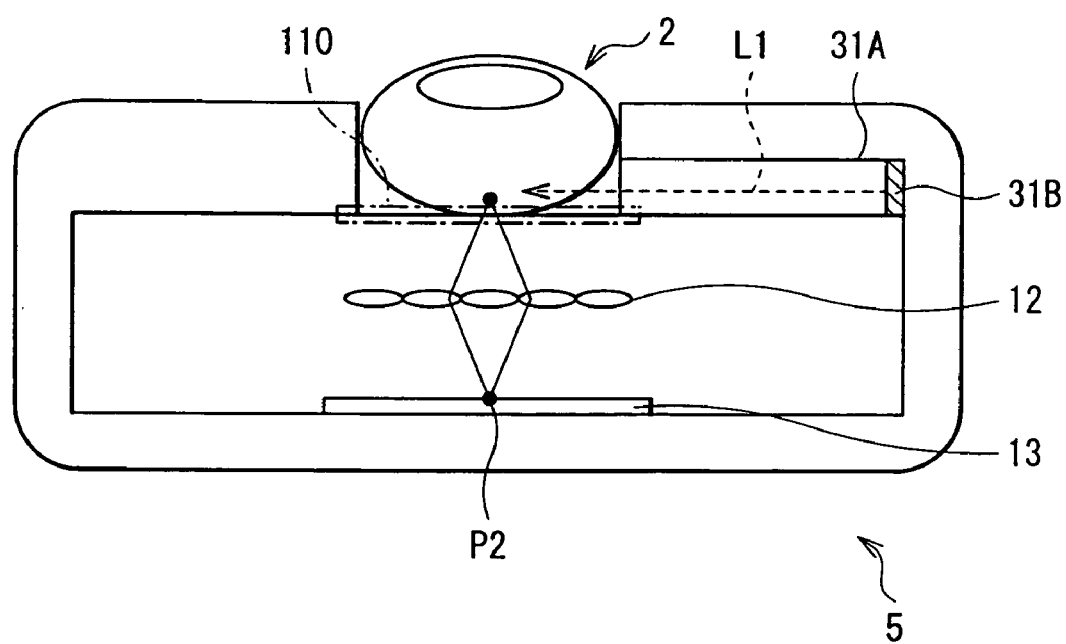
FIG. 15 is a schematic view illustrating a brief configuration of a biometrics authentication system according to a third modification example of the invention.

FIG. 15 is a schematic view illustrating a brief configuration of a biometrics authentication system 5 according to Modification Example 3. FIGS. 16(A), 16(B) and 16(C) are illustrations of the biometrics authentication system 5 viewed from one side (from a light guide section 31A side), from above, and from the other side, respectively. The biometrics authentication system 5 has the same configuration as that of the above-described biometrics authentication system 1 except for the arrangements of the light source 10, a light guide section 31A and a diffraction section 31B.

In the biometrics authentication system 5, the light guide section 31A is arranged in a region which is in proximity to the detection section 110 but is not opposed to the detection section 110, for example, a side of the living body 2. The light guide section 31A is arranged, for example, only in a region on one side of the detection section 110 along the longitudinal direction of the rectangular detection section 110. The light source 10 is arranged at an end in the longitudinal direction of the light guide section 31A, and a diffraction surface of the diffraction section 31B is arranged on a side surface of the light guide section 31A.

By such a configuration, light from the light source 10 propagates through the light guide section 31A by total reflection, and is diffracted in the diffraction section 31B, thereby the total reflection conditions are not satisfied, and the light is guided from the side surface of the light guide section 31A to outside. At this time, the light guide section 31A is arranged in a region which is in proximity to the detection section 110 but is not opposed to the detection section 110, so the light guided from the light guide section 31A enters from the side of the living body 2 to be applied to a region A inside the living body 2. Thereby, the light is allowed to be applied to a necessary region inside the living body 2 for vein image pickup, and the same effects as those in the biometrics authentication system 1 of the above-described embodiment are obtainable. Moreover, at this time, the light guided out from the light guide section 31A reaches the inside of the living body 2 not through a front surface (a part opposed to the detection section 110) of the living body 2, so the influence of a fingerprint on the front surface of the living body 2 or a joint part which causes impediment to vein authentication is allowed to be excluded. Therefore, the authentication accuracy is improved, and the security level is allowed to be further improved.

MODIFICATION EXAMPLE 4

Figure 17:
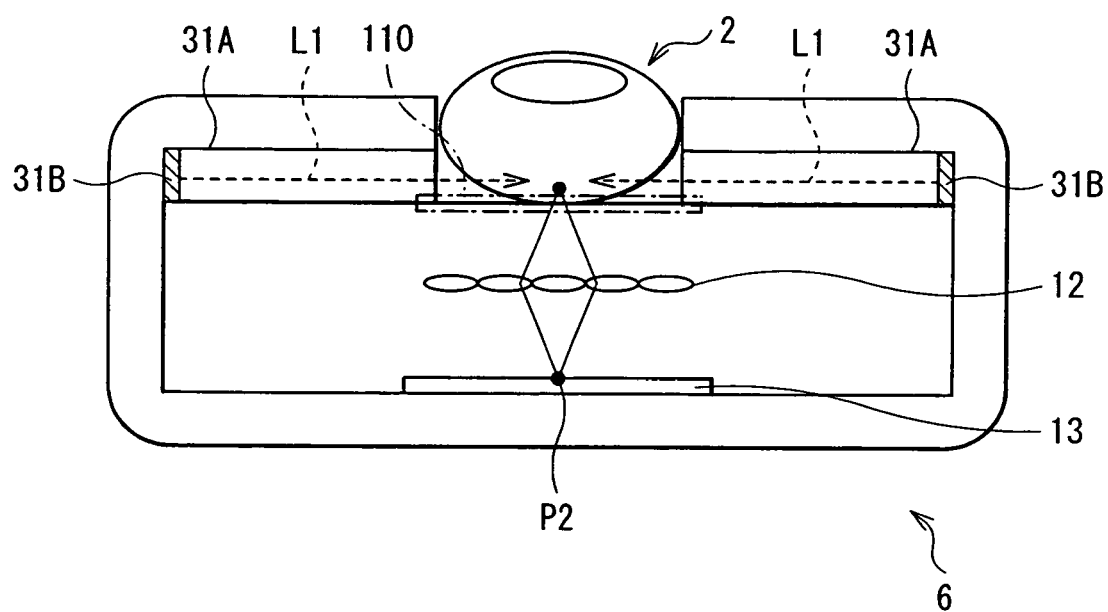
FIG. 17 is a schematic view illustrating a brief configuration of a biometrics authentication system according to a fourth modification example of the invention.

FIG. 17 is a schematic view illustrating a brief configuration of a biometrics authentication system 6 according to Modification Example 4. FIGS. 18(A), 18(B) and 18(C) are illustrations of the biometrics authentication system 6 viewed from one side, from above and from the other side, respectively. The biometrics authentication system 6 has the same configuration as that of the biometrics authentication system 5 according to the above-described Modification Example 3, except that the light sources 10, the light guide sections 31A and the diffraction sections 31B are arranged on both sides of the detection section 110.

In the biometrics authentication system 6, the light guide sections 31A are arranged in regions on both sides of the detection section 110 along the longitudinal direction of the detection section 110 of a region which is in proximity to the detection section 110 but is not opposed to the detection section 110. The light source 10 is arranged at one end in the longitudinal direction of each of the light guide sections 31A, and a diffraction surface of each diffraction section 31B is arranged on a side surface of each light guide section 31A. Even if the light guide sections 31A are arranged on both sides of the detection section 110 in such a manner, the same effects as those in the biometrics authentication system 1 according to the above-described embodiment are obtainable. Moreover, light is applied to the region A inside the living body 2 from each light guide section 31A, so compared to the case where light is applied from one side, light is allowed to be uniformly applied.

MODIFICATION EXAMPLE 5

FIGS. 19(A) to 19(C) are schematic views illustrating a brief configuration of a biometrics authentication system 7 according to Modification Example 5, and FIGS. 19(A), 19(B) and 19(C) are illustrations of the biometrics authentication system 7 viewed from one side, from above and from the other side, respectively. The biometrics authentication system 7 has the same configuration as that of the biometrics authentication system 1 according to the above-described embodiment, except for the arrangements of the light source 10, a light guide section 32A and a diffraction section 32B.

In the biometrics authentication system 7, the light guide section 32A is arranged in a region which is in proximity to the detection section 110 but is not opposed to the detection section 110, for example, a region surrounding the detection section 110. The light source 10 is arranged at one end in the longitudinal direction of the light guide section 32A, and a diffraction surface of the diffraction section 32B is arranged along a side surface of the light guide section 32A. Even if the light guide section 32A is arranged so as to surround the detection section 110 in such a manner, the same effects as those in the biometrics authentication system 1 according to the above-described embodiment are obtainable. Moreover, light is applied from around the living body 2 to the inside of the living body 2, so compared to the case where light is applied from one side, light is allowed to be uniformly applied.

Alternatively, as illustrated in FIGS. 20(A) to 20(C), the light sources 10 may be arranged at both ends of the light guide section 32A. Thereby, the light amount is easily adjusted, and light is allowed to be applied more uniformly.

MODIFICATION EXAMPLE 6

FIGS. 21(A) to 21(C) are schematic views illustrating a brief configuration of a biometrics authentication system 8 according to Modification Example 6, and FIGS. 20(A), 20(B) and 20(C) are illustrations of the biometrics authentication system 8 viewed from one side, from above and from the other side, respectively. The biometrics authentication system 8 has the same configuration as that of the biometrics authentication system 1 according to the above-described embodiment, except for the arrangements of the light sources 10, light guide sections 33A and diffraction sections 33B.

In the biometrics authentication system 8, the light guide sections 33A are arranged at both ends in the longitudinal direction of the detection section 110 so as to be opposed to the detection section 110. In the modification example, the detection section 110 for placing the living body 2 is made of a cover glass or the like, and the light guide sections 33A are arranged on lower end sections of the detection section 110. The light sources 10 are arranged so as to emit light toward the longitudinal direction of the detection section 110, and a diffraction surface of each diffraction section 33B is arranged a bottom surface of each light guide section 33A.

By such a configuration, when light from the light source 10 propagates through the light guide section 33A by total reflection, the light is diffracted in the diffraction section 33B arranged on the bottom surface of the light guide section 33A, thereby the total reflection conditions are not satisfied, and the light is guided out from a top surface of the light guide section 33A. Thereby, the light is applied toward the region A above the light guide section 33A of the living body 2 placed on the detection section 110. A region around the center of the longer direction of the living body 2 is indirectly irradiated with light applied to a region around an end in the longer direction of the living body 2. Therefore, even if the light guide sections 33A are arranged at both ends along the longitudinal direction of the detection section 110 so as to be opposed to the detection section 110, the same effects as those in the biometrics authentication system 1 of the above-described embodiment are obtainable.

Moreover, only a region not opposed to the light guide section 33A of the detection section 110, that is, a region sandwiched between the light guide sections 33A may be an image pickup region 110A by the microlens array 12 and the image pickup device 13. Thereby, the influence of a fingerprint on the front surface of the living body 2, a joint or the like around the irradiated region A is allowed to be excluded.

Further, as illustrated in FIGS. 22 and 23, the light source 10 may be arranged so as to emit light in a shorter direction of the detection section 110. Even in such a case, light emitted from the light source 10 propagates through the light guide section 33A, and is diffracted by the diffraction section 33B, thereby to be guided out from a top surface of the light guide section 33A. In this regard, FIG. 22 is an illustration in which the light sources 10 are arranged at both ends of the light guide section 33A, and FIG. 23 is an illustration in which the light source 10 is arranged at one end of the light guide section 33A.

Although the present invention is described referring to the embodiment and the modification examples, the invention is not limited thereto, and may be variously modified.

For example, in the above-described embodiment and the like, the case where biometrics authentication is performed based on the obtained vein pattern is described, but the invention is not limited thereto, and, for example, a fingerprint pattern and a vein pattern may be obtained, and a final authentication result may be outputted based on these results. In this case, image pickup data of a fingerprint of the living body 2 may be obtained by adjusting the refractive powers of the microlenses so that the microlenses focus on a surface (a surface in contact with the light guide section 11) of the living body 2. When both of fingerprint authentication and vein authentication are used in such a manner, a more accurate authentication result is obtainable.

Moreover, in the above-described embodiment, the case where while the refractive index of the liquid crystal layer 123 is reduced by reducing the supply voltage from the voltage supply section 17 to the microlenses in the microlens array 12, thereby to reduce the refraction angles of incident light rays to the microlenses, the refractive index of the liquid crystal layer 123 is increased by increasing the supply voltage, thereby to increase the refraction angles of the incident light rays to the microlenses is described, but depending on the kind of a liquid crystal material of which the liquid crystal layer 123 is made, conversely, the refractive index may be increased by increasing the supply voltage, and the refractive index may be reduced by reducing the supply voltage. Even in such a configuration, the same effects as those in the above-described embodiment are obtainable.

Further, in the above-described embodiment, the case where the image processing section 14 performs appropriate image processing on image pickup data obtained in the image pickup device 13, and then authentication is performed is described; however, for example, in some cases, the authentication section 16 may directly perform authentication based on the image pickup data from the image pickup device 13 without arranging the image processing section 14. In such a case, the configuration of the system may be further simplified, and the profile of the whole system may be further reduced.

Moreover, in the above-described embodiment, in the microlens array 12, the case where the surface S1 of the surfaces S1 and S2 of the electrodes 122 and 124 is a curved surface is described, but, for example, the surface S2 may be a curved surface, thereby microlenses having curved surfaces on both sides of the liquid crystal layer 123 may be formed.

Further, in the above-described embodiment, the case where the microlenses are made of liquid crystal microlenses is described; however, microlenses with any other configuration may be used as long as the microlenses make the refraction direction of the incident light ray variable according to an applied voltage, and, for example, liquid microlenses using two liquid layers of different kinds may be used.

Moreover, in the above-described embodiment, the configuration in which the light source 10 is arranged only at one end of the light guide section 11A is described as an example; however, the invention is not limited thereto, and the light sources 10 may be arranged at both ends of the light guide section 11A. In general, the light amount of light emitted from the light source 10 is gradually reduced with increase in distance from the light source 10, so when the light sources 10 are arranged at both ends of the light guide section 11A, unevenness in light amounts of the light sources 10 may be prevented. Therefore, light may be uniformly applied to the living body 2.

Further, in the above-described embodiment, the configuration in which the diffraction section is arranged on one side surface of the light guide section is described as an example; however, the invention is not limited thereto, and the diffraction section may be arranged on the other side surface of the light guide section, or the diffraction sections may be arranged on both side surfaces of the light guide section.

The invention claimed is:

1. A biometrics authentication system comprising: a light source; a detection section where a living body is placed;
    a light guide section totally reflecting light emitted from the light source to guide the light to the living body;
    a diffraction section diffracting light propagating through the light guide section, the diffraction section including a plurality of groove sections with each groove section having a depth, the depths of the groove sections are adjusted so that a diffraction efficiency of the diffraction section changes with respect to the distance from the light source;
    an image pickup lens section condensing light from the living body and including a micro lens array having a plurality of micro lenses, the micro lens array operative to change its refractive characteristics;
    an image pickup device obtaining image pickup data based on the light condensed by the image pickup lens section; and
    an authentication section performing authentication of the living body based on the image pickup data obtained in the image pickup device.

2. The biometrics authentications system according to claim 1, wherein
    the light guide section is arranged in a region opposed to the detection section between the detection section and the image pickup lens section.

3. The biometrics authentication system according to claim 2, wherein the diffraction section is arranged on a surface on the image pickup lens side of the light guide section so as not to be opposed to the detection section.

4. The biometrics authentication system according to claim 2, wherein
the living body is a finger, and
the light guide section is arranged so as to allow light emitted from the light source to propagate along a longer direction of the finger.

5. The biometrics authentication system according to claim 2, wherein
the diffraction section diffracts only a specific polarized component of light propagating through the light guide section, and
the biometrics authentication system includes a ¼ wave plate between the detection section and the light guide section, the ¼ wave plate arranged opposed to the diffraction section.

6. The biometric image pickup apparatus according to claim 2, wherein
the diffraction section and the image pickup lens section are arranged on a common plane and project therefrom in a same direction.

7. The biometrics authentication system according to claim 6, wherein
the image pickup lens section is integrally formed with the light guide section on a condensing optical path.

8. The biometrics authentication system according to claim 6, wherein
the image pickup lens section is made of a diffraction lens.

9. The biometrics authentication system according to claim 1, wherein
the light guide section is arranged in a region which is in proximity to the detection section but is not opposed to the detection section.

10. The biometrics authentication system according to claim 9, wherein
the living body is a finger, and
the light guide section is arranged only in a region on one side of the detection section along the longitudinal direction of the detection section.

11. The biometrics authentication system according to claim 9, wherein
the living body is a finger, and
the light guide sections are arranged in regions on both sides of the detection section along the longitudinal direction of the detection section.

12. The biometrics authentication system according to claim 9, wherein
the living body is a finger, and
the light guide section is arranged so as to surround the detection section.

13. The biometrics authentication system according to claim 9, wherein
a diffraction surface of the diffraction section is arranged on a side surface of the light guide section.

14. The biometrics authentication system according to claim 1, wherein
the living body is a finger, and
the light guide sections are arranged at both ends in the longitudinal direction of the detection section so as to be opposed to the detection section.

15. The biometrics authentication system according to claim 14, wherein
a region not opposed to the light guide section of the detection section is an image pickup region by the image pickup lens section and the image pickup device.

16. A biometrics authentication system comprising: a light source; a detection section where a living body is placed;
a light guide section totally reflecting light emitted from the light source to guide the light to the living body;
a diffraction section diffracting light propagating through the light guide section; an image pickup lens section condensing light from the living body; an image pickup device obtaining image pickup data based on the light condensed by the image pickup lens section; and
an authentication section performing authentication of the living body based on the image pickup data obtained in the image pickup device, wherein
a diffraction surface of the diffraction section is arranged on a surface on the image pickup lens side of the light guide section; the diffraction section includes a plurality of groove sections with each groove section having a depth, the depths of the groove sections are adjusted so that a diffraction efficiency of the diffraction section changes with respect to the distance from the light source.

17. The biometrics authentication system comprising:
a light source;
a detection section where a living body is placed;
a light guide section totally reflecting light emitted from the light source to guide the light to the living body;
a diffraction section diffracting light propagating through the light guide section;
an image pickup lens section condensing light from the living body;
an image pickup device obtaining image pickup data based on the light condensed by the image pickup lens section; and
an authentication section performing authentication of the living body based on the image pickup data obtained in the image pickup device, wherein
the diffraction section is configured so that its diffraction efficiency is increased with increase in distance from the light source.

18. The biometrics authentication system according to claim 1, wherein
the depths of the groove sections are adjusted so that the diffraction efficiency of the diffraction section is increased with increase in distance from the light source.

19. The biometrics authentication system according to claim 1, wherein
the light sources are arranged at both ends of the light guide section.

20. The biometrics authentication system according to claim 1, comprising:
a voltage supply section for applying a voltage to the microlenses,
wherein the microlenses make the diffraction directions of incident light rays variable according to a voltage applied by the voltage supply section.

21. The biometrics authentication system according to claim 20, wherein
the image pickup lens section is configured to include:
a pair of substrates,
a pair of electrodes formed on the substrates, the pair of electrodes to which a voltage from the voltage supply section is applied, and
a liquid crystal layer arranged between the pair of electrodes,
wherein one or both of the pair of electrodes have curved surfaces for forming the microlenses.

22. The biometrics authentication system according to claim 1, wherein the light source emits light in a near-infrared wavelength region.

23. The biometrics authentication system according to claim 1, wherein
the living body is a finger,
the image pickup device produces image pickup data of veins of the finger, and
the authentication section performs authentication of the living body based on the image pickup data of the veins.

24. The biometrics authentication system according to claim 1, further comprising a controller and a voltage supply section for applying a voltage to the microlenses such that the controller controls the voltage supply section in a manner to cause the voltage supply section to provide a relatively large voltage to the microlenses resulting in a relatively large refractive index, a relatively large refractive angle and a relatively short focal length or a relatively small voltage to the microlenses resulting in a relatively small refractive index, a relatively small refractive angle and a relatively long focal length.

* * * * *